US012199341B2

(12) United States Patent
Chan et al.

(10) Patent No.: US 12,199,341 B2
(45) Date of Patent: Jan. 14, 2025

(54) ANTENNA DEVICE

(71) Applicant: TMY Technology Inc., Taipei (TW)

(72) Inventors: Chun-Cheng Chan, Taipei (TW); Jiun-Wei Wu, Taipei (TW); Su-Wei Chang, Taipei (TW)

(73) Assignee: TMY Technology Inc., New Taipei (TW)

( * ) Notice: Subject to any disclaimer, the term of this patent is extended or adjusted under 35 U.S.C. 154(b) by 156 days.

(21) Appl. No.: 17/893,188

(22) Filed: Aug. 23, 2022

(65) Prior Publication Data

US 2023/0223682 A1 Jul. 13, 2023

Related U.S. Application Data

(60) Provisional application No. 63/298,188, filed on Jan. 10, 2022.

(30) Foreign Application Priority Data

Jun. 7, 2022 (TW) ................................. 111121098

(51) Int. Cl.
*H01Q 1/50* (2006.01)
*H01Q 9/04* (2006.01)

(52) U.S. Cl.
CPC ............. *H01Q 1/50* (2013.01); *H01Q 9/0414* (2013.01)

(58) Field of Classification Search
CPC .......... H01Q 1/38; H01Q 1/50; H01Q 9/0414; H01Q 9/28
See application file for complete search history.

(56) References Cited

U.S. PATENT DOCUMENTS 6,525,623 B2 * 2/2003 Sridharan ............ H05K 1/0237 333/136
2011/0267244 A1 * 11/2011 Rajgopal .................. H01Q 1/38 29/601

(Continued)

FOREIGN PATENT DOCUMENTS

CN 112886236 6/2021
TW 201315010 4/2013

(Continued)

OTHER PUBLICATIONS

"Office Action of Taiwan Counterpart Application", issued on Jun. 30, 2023, p. 1-p. 5.

*Primary Examiner* — Thien M Le
(74) *Attorney, Agent, or Firm* — JCIPRNET

(57) ABSTRACT

An antenna device includes a differential antenna and a first balun. The differential antenna includes a first radiator, a first antenna port and a second antenna port connected to a first surface of the first radiator. Orthographic projections of the first antenna port and the second antenna port projected to the first radiator are symmetrical to a midpoint of the first radiator. The first balun is located on one side of the first surface of the first radiator, and its orthographic projection on the first plane where the first surface is located overlaps the first surface. The first balun includes a first port, a first wiring, a first coupling structure electrically connected to the first antenna port, and a second coupling structure electrically connected to the second antenna port. Neither the first coupling structure nor the second coupling structure directly contacts the first wiring.

17 Claims, 27 Drawing Sheets

(56) References Cited

U.S. PATENT DOCUMENTS

| | | | | |
|---|---|---|---|---|
| 2014/0240056 | A1 | 8/2014 | Isom et al. | |
| 2015/0108996 | A1* | 4/2015 | Vaucher | G01R 31/2822 324/537 |
| 2015/0156005 | A1* | 6/2015 | Sjoland | H04B 1/525 370/278 |
| 2016/0190671 | A1* | 6/2016 | Carmon | H01P 5/107 333/26 |
| 2017/0005694 | A1* | 1/2017 | Zhang | H04B 1/006 |
| 2018/0278240 | A1* | 9/2018 | Visser | H01Q 7/00 |
| 2019/0044243 | A1* | 2/2019 | Vollmer | H01Q 9/28 |
| 2021/0159610 | A1* | 5/2021 | Manesh | G01S 7/025 |
| 2021/0167481 | A1* | 6/2021 | Li | H01P 1/202 |
| 2023/0420835 | A1* | 12/2023 | Tang | H01P 1/20381 |

FOREIGN PATENT DOCUMENTS

| | | |
|---|---|---|
| TW | I711216 | 11/2020 |
| TW | M633405 | 10/2022 |

* cited by examiner

ANTENNA DEVICE

CROSS-REFERENCE TO RELATED APPLICATION

This application claims the priority benefits of U.S. provisional application Ser. No. 63/298,188, filed on Jan. 10, 2022, and Taiwanese application serial no. 111121098, filed on Jun. 7, 2022. The entirety of each of the above-mentioned patent applications is hereby incorporated by reference herein and made a part of this specification.

BACKGROUND

Technical Field

The present disclosure relates to a device, and more particularly, to an antenna device.

Description of Related Art

With the advanced development and application of electronics and communications technologies and so on, the design of electronic devices has been gradually miniaturized over the past few years, and the requirements for the performance of antennas have been set higher. On the other hand, general communication equipment also sets requirements for the field symmetry of the antenna. However, although the common dual-feed antenna has good field symmetry, the configuration of the external feed signal line requires a relatively large space, which makes it difficult to achieve miniaturization. Therefore, how to make the miniaturized antenna have good field symmetry is an urgent problem to be solved in the field.

SUMMARY

The present disclosure provides an antenna device, the antenna device includes a first balance-to-unbalance converter (BALUN) with a multi-layer structure and a differential antenna, the first balun has good performance in converting single-ended signal and double-ended signal, and the antenna device maintains good field symmetry and antenna performance.

An antenna device of the disclosure includes a differential antenna and a first balun. The differential antenna includes a first radiator, a first antenna port and a second antenna port. The first radiator includes a first surface. The first antenna port is connected to the first surface of the first radiator. The second antenna port is connected to the first surface of the first radiator. The orthographic projections of the first antenna port and the second antenna port projected to the first radiator are symmetrical to the midpoint of the first radiator. The first balun is located on one side of the first surface of the first radiator, and its orthographic projection on the first plane where the first surface is located overlaps the first surface. The first balun includes a first port, a first wiring, a first coupling structure, and a second coupling structure. The first wiring is connected to the first port and extends along a first direction. The first coupling structure is electrically connected to the first antenna port. The second coupling structure is electrically connected to the second antenna port. Neither the first coupling structure nor the second coupling structure directly contacts the first wiring. The orthographic projection of the first coupling structure on the first plane and the orthographic projection of the second coupling structure on the first plane are both equally divided by the orthographic projection of the first wiring on the first plane.

DESCRIPTION OF THE EMBODIMENTS

Figure 1A:
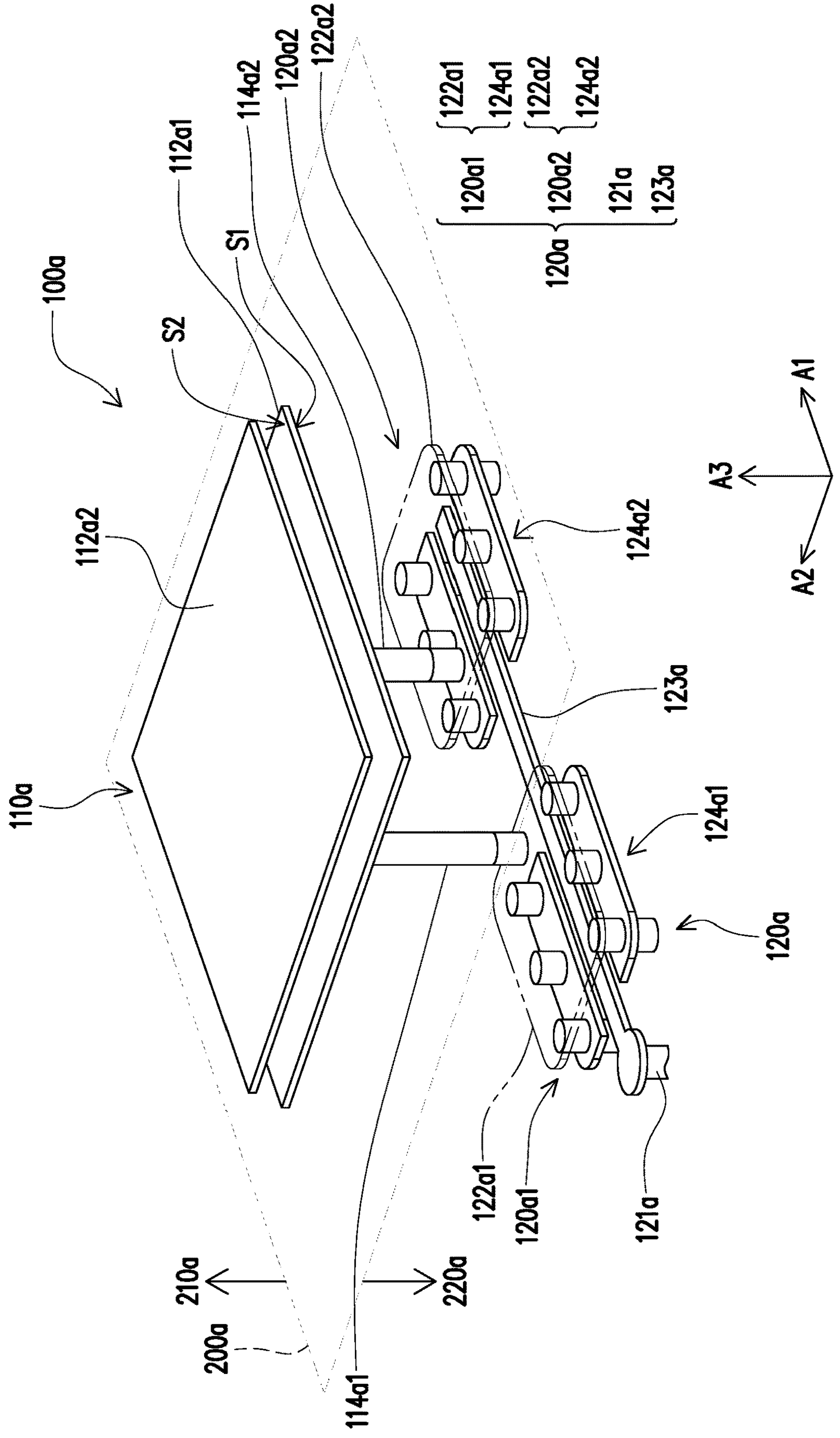
FIG. 1A is a schematic view of an antenna device according to an embodiment of the present disclosure.

FIG. 1A is a schematic view of an antenna device according to an embodiment of the present disclosure. A coordinate system consisting of a first direction A1, a second direction A2 and a third direction A3 is provided here for clear description of the elements, and the first direction A1, the second direction A2 and the third direction A3 are perpendicular to each other. Referring to FIG. 1A, the antenna device 100*a* of this embodiment includes a differential antenna 110*a* and a first balanced-to-unbalanced converter (BALUN) 120*a*. The first balun 120*a* is adapted to convert a single-ended signal into a double-ended signal and transmit the signal to the differential antenna 110*a*. Alternatively, the antenna device 100*a* is adapted to convert the double-ended signal received by the differential antenna 110*a* into a single-ended signal through the first balun 120*a*.

A single-ended signal is a signal transmitted over one transmission line. Here, a first port 121*a* of the first balun 120*a* is adapted to receive a single-ended signal from an external circuit (not shown) and transmit the single-ended signal through a first wiring 123*a*. A conventional double-ended signal is two signals transmitted through two lines respectively, and the two signals have the same amplitude and opposite phases (that is, the phase difference between the two signals is 180 degrees).

Specifically, when the antenna device 100*a* outputs a signal through the differential antenna 110*a*, the antenna device 100*a* converts the single-ended signal into a double-ended signal through a first coupling structure 120*a*1 and a second coupling structure 120*a*2 of the first balun 120*a* and transmits the double-ended signal to the differential antenna 110*a* for output. When the antenna device 100*a* receives a signal, the antenna device 100*a* converts the double-ended signal received by the differential antenna 110*a* into a single-ended signal through the first balun 120*a* and transmits the single-ended signal to the first port 121*a* through the first wiring 123*a*.

As shown in FIG. 1A, the differential antenna 110*a* includes a first radiator 112*a*1, a first antenna port 114*a*1 and a second antenna port 114*a*2. The first radiator 112*a*1 includes a first surface S1. The first antenna port 114*a*1 and the second antenna port 114*a*2 are connected to the first surface S1 of the first radiator 112*a*1. The differential antenna 110*a* is adapted to be connected to the first balun 120*a* through the first antenna port 114*a*1 and the second antenna port 114*a*2.

Here, the first surface S1 is located on a first plane 200*a*, and the first plane 200*a* is a virtual plane. The first plane 200*a* may be regarded as an extension of the first surface S1 of the first radiator 112*a*1, whereby the antenna device 100*a* may be divided into a first region 210*a* (the region above the first plane 200*a*) and a second region 220*a* (the region under the first plane 200*a*). The first radiator 112*a*1 further includes a second surface S2 opposite to the first surface S1. The second surface S2 is located in the first region 210*a*.

Figure 1B:
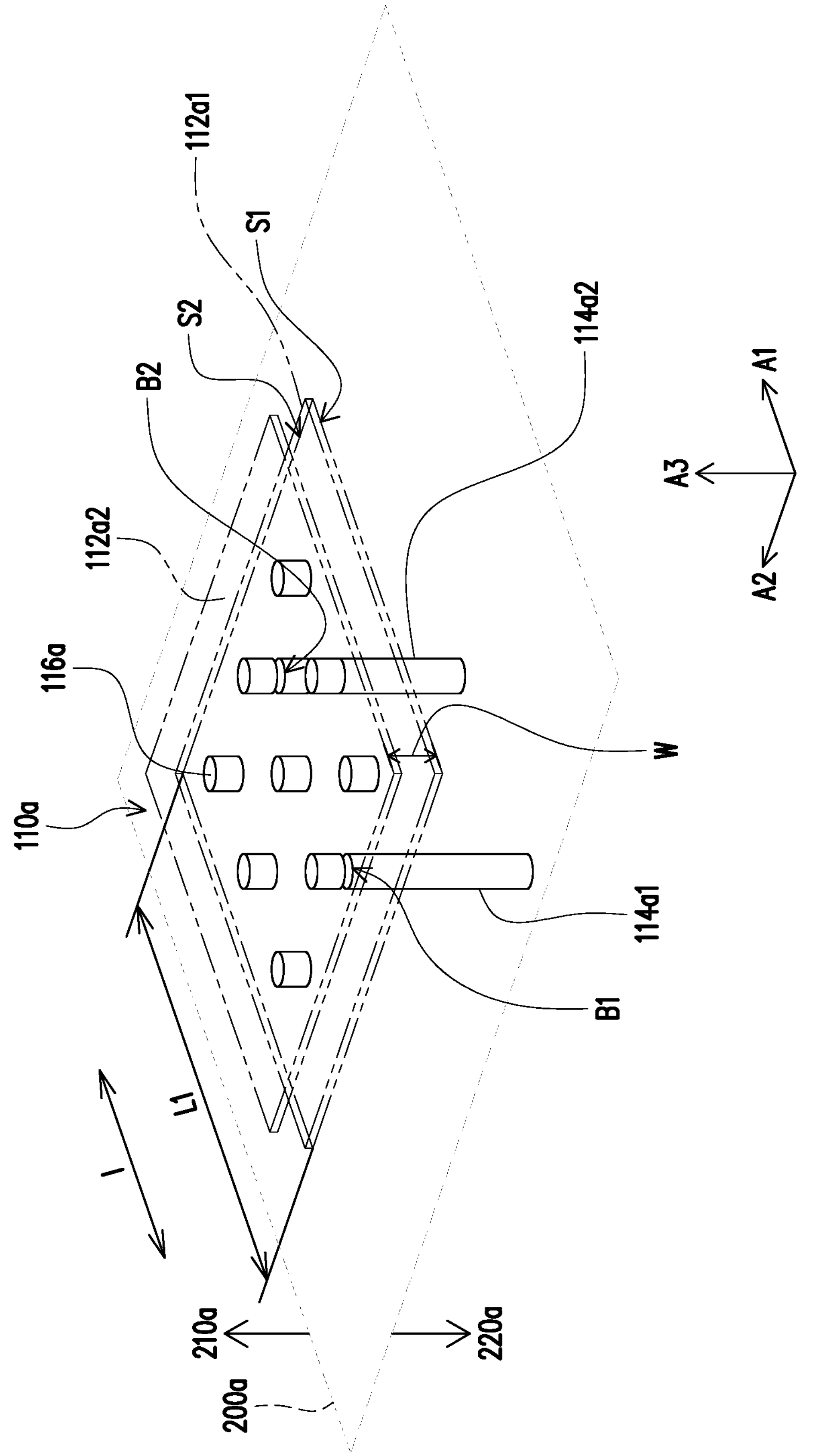
FIG. 1B is a schematic view of the differential antenna of FIG. 1A.

FIG. 1B is a schematic view of the differential antenna of FIG. 1A. In FIG. 1B, some elements of the differential antenna 110*a* are shown in perspective view. The differential antenna 110*a* of this embodiment further includes a second radiator 112*a*2 located above the second surface S2 of the first radiator 112*a*1, and a plurality of vias 116*a* connected to the first radiator 112*a*1 and the second radiator 112*a*2.

The first surface S1 of the first radiator 112*a*1 and the upper surface of the second radiator 112*a*2 are spaced apart by a thickness W in the third direction A3. In this manner, the first radiator 112*a*1, the second radiator 112*a*2, and these vias 116*a* may be regarded as radiators having a thickness W. The setting of the differential antenna 110*a* is not limited thereto. In other embodiments, the differential antenna 110*a* may not include the second radiator 112*a*2 and the vias 116*a*. Users may set the differential antenna 110*a* according to their needs.

As shown in FIG. 1B, the second radiator 112*a*2 and the vias 116*a*, as well as the first antenna port 114*a*1 and the second antenna port 114*a*2 are connected to two opposite planes of the first radiator 112*a*1 and are located on two opposite sides of the first plane 200*a*. The first region 210*a* includes a first radiator 112*a*1 and a second radiator 112*a*2 for transmitting and receiving signals and the vias 116*a*, and the second region 220*a* includes a first antenna port 114*a*1 and a second antenna port 114*a*2 for transmitting signals. Here, the differential antenna 110*a* has nine vias 116*a*, and the vias 116*a* are arranged at substantially equal intervals, but not limited thereto.

Figure 1C:
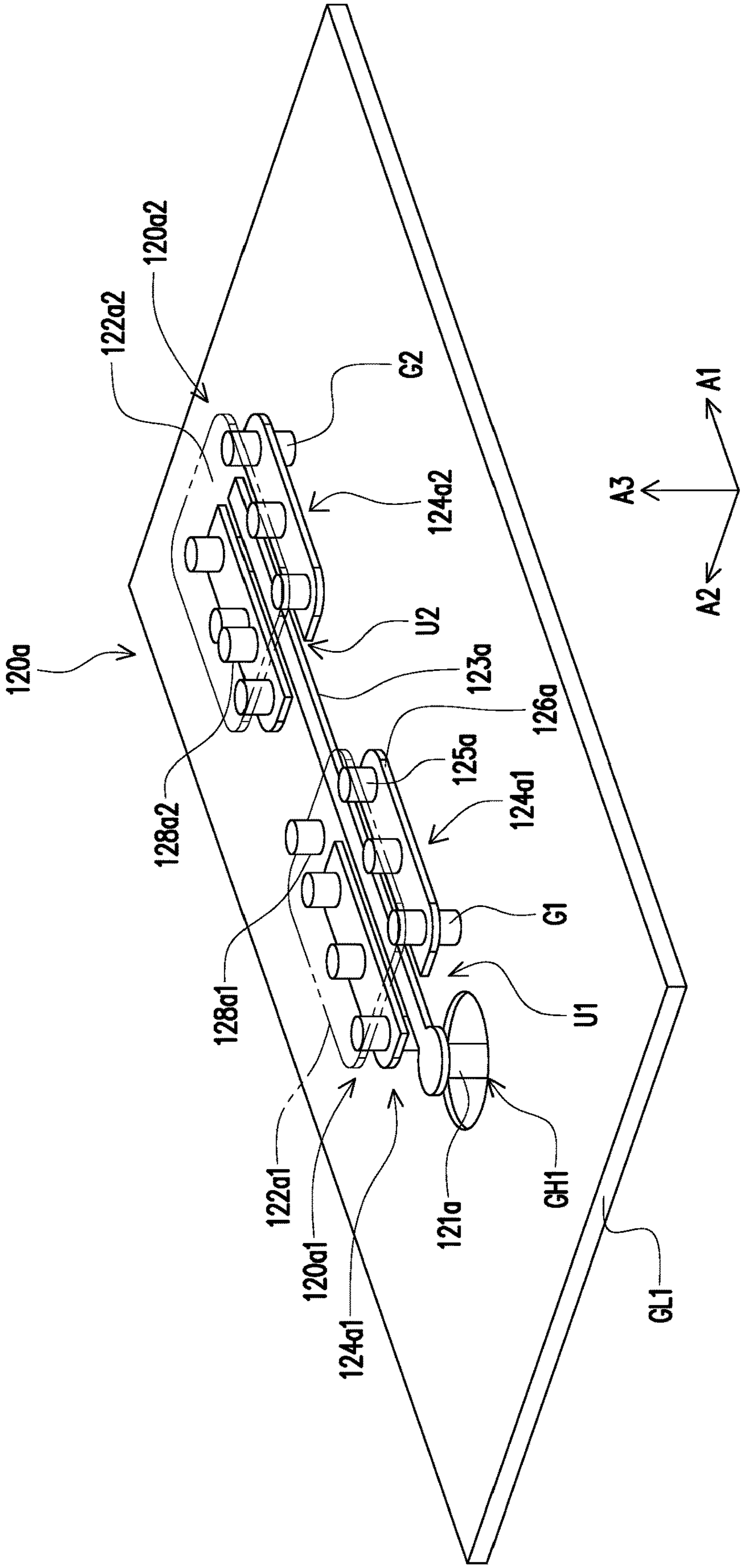
FIG. 1C is a schematic view of the first balun of FIG. 1A.

FIG. 1C is a schematic view of the first balun of FIG. 1A. In FIG. 1C, some elements of the first balun 120*a* are shown in perspective view. Please refer to FIG. 1A and FIG. 1C simultaneously, the first balun 120*a* is connected to the first antenna port 114*a*1 and the second antenna port 114*a*2 and is located in the second region 220*a* (FIG. 1A).

As shown in FIG. 1C, the first balun 120*a* includes a first port 121*a*, a first wiring 123*a*, a first coupling structure 120*a*1 and a second coupling structure 120*a*2. The first wring 123*a* is connected to the first port 121*a* and extends along the first direction A1. The first coupling structure 120*a*1 is electrically connected to the first antenna port 114*a*1. The second coupling structure 120*a*2 is electrically connected to the second antenna port 114*a*2.

The first coupling structure 120*a*1 is located between the second coupling structure 120*a*2 and the first port 121*a*, and the structures of the first coupling structure 120*a*1 and the second coupling structure 120*a*2 are similar. Neither the first coupling structure 120*a*1 nor the second coupling structure 120*a*2 directly contacts the first wiring 123*a*.

Here, the first coupling structure 120*a*1 includes a first conductor layer 122*a*1 and two first sidewall structures 124*a*1 connected to the first conductor layer 122*a*1, and the second coupling structure 120*a*2 includes a second conductor layer 122*a*2 and two second sidewall structures 124*a*2 connected to the second conductor layer 122*a*2, but the disclosure is not limited thereto. The first sidewall structure 124*a*1 is composed of a plurality of side pillars 125*a* and a side plate 126*a*. The second sidewall structure 124*a*2 is composed of a plurality of side pillars 125*a* and a side plate 126*a*. The side pillar 125*a* is disposed between the side plate 126*a* and the first conductor layer 122*a*1 and between the side plate 126*a* and the second conductor layer 122*a*2 along the third direction A3.

Here, the four corners of the first conductor layer 122*a*1 and the four corners of the second conductor layer 122*a*2 are, for example but not limited to, rounded corners, and the four corners of the side plate 126*a* are a combination of rounded corners and right angles, but the disclosure is not limited thereto. For example, in other embodiments not shown, the corners of the first conductor layer 122*a*1, the second conductor layer 122*a*2 and the side plate 126*a* may be right angles, rounded corners or polygons, or a combination of rounded corners, right angles and polygons.

The two first sidewall structures 124*a*1 are disposed on both sides of the first conductor layer 122*a*1, and together with the first conductor layer 122*a*1 form a first U-shaped groove U1. The two second sidewall structures 124*a*2 are disposed on both sides of the second conductor layer 122*a*2, and together with the second conductor layer 122*a*2 form a second U-shaped groove U2.

The first wiring 123*a* passes through the first U-shaped groove U1 and the second U-shaped groove U2, and is located between the two first sidewall structures 124*a*1 and the two second sidewall structures 124*a*2. Here, the openings of the first U-shaped groove U1 and the second U-shaped groove U2 face away from the first radiator 112*a*1 (see FIG. 1A), so that the first conductor layer 122*a*1 and the second conductor layer 122_a_2 are located between the first wiring 123_a_ and the first radiator 112_a_1, but the disclosure is not limited thereto.

The first conductor layer 122_a_1 and the second conductor layer 122_a_2 do not directly contact the first wiring 123_a_, the first conductor layer 122_a_1 and the second conductor layer 122_a_2 are located on the same plane (the first layer), the first wiring 123_a_ and the side plate 126_a_ are located on another plane (the second layer), and the two planes are parallel to each other, so that the first balun 120_a_ has a multi-layer structure.

As shown in FIG. 1C, the first wiring 123_a_ may be regarded as being covered by the first coupling structure 120_a_1 and the second coupling structure 120_a_2, and the user may adjust the coupling amount of the first balun 120_a_ by adjusting the first coupling structure 120_a_1 and the second coupling structure 120_a_2 with coverage properties.

Figure 1D:
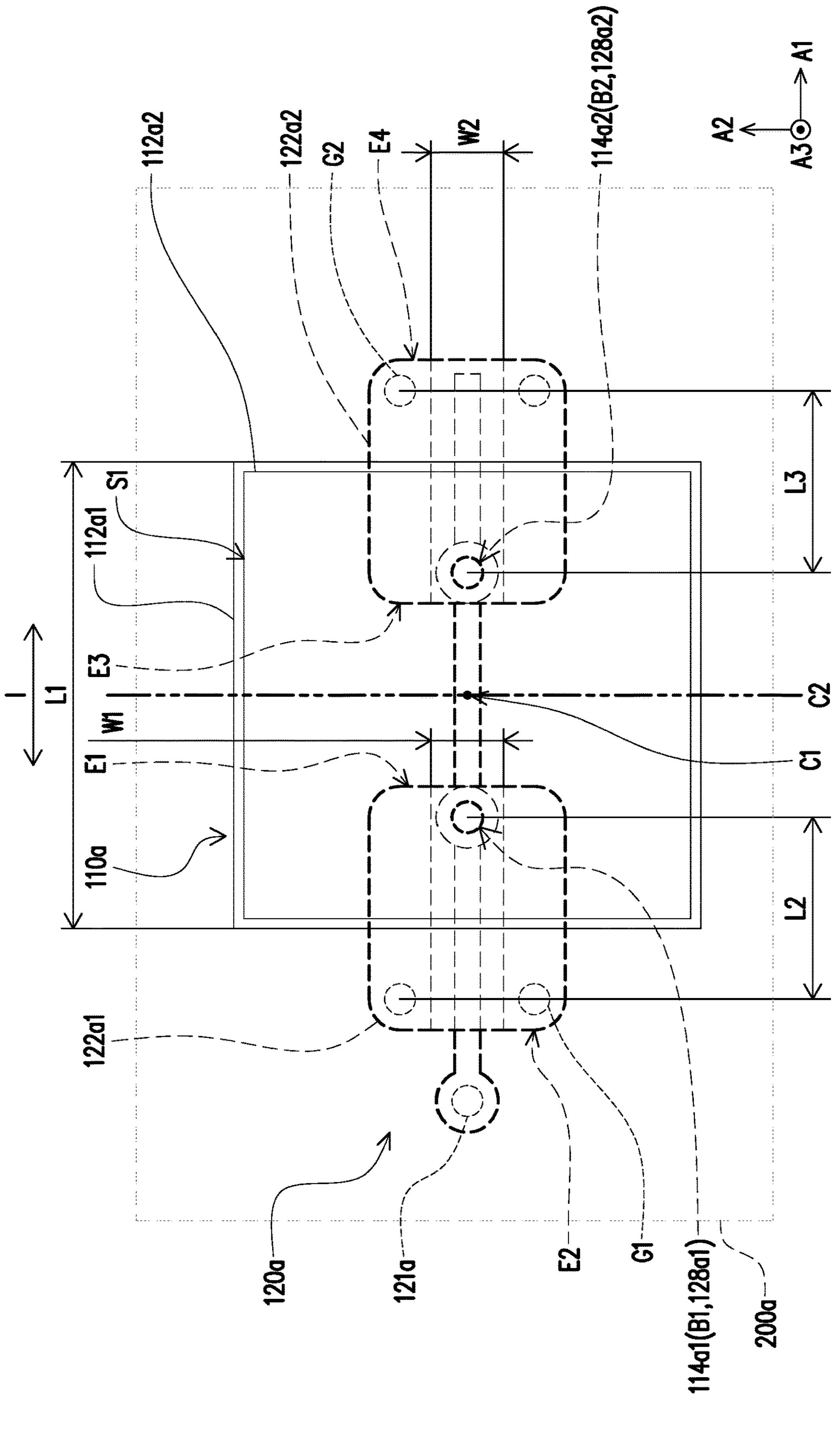
FIG. 1D is a top view of the antenna device of FIG. 1A.

For example, the first U-shaped groove U1 has an opening width W1 (see FIG. 1D), and the second U-shaped groove U2 has another opening width W2 (see FIG. 1D). The opening widths W1 and W2 depend on the distance between the two side plates 126_a_. The user may adjust the coupling amount of the first balun 120_a_ by adjusting the opening widths W1 and W2.

In the conventional antenna device, the balun is a single-layer structure and requires two wirings to transmit double-ended signals. The user may control the coupling amount of the balun by adjusting the distance between the two wirings. Returning to FIG. 1C, in this embodiment, the first balun 120_a_ adjusts the coupling amount through the opening widths W1 and W2 of the first U-shaped groove U1 and the second U-shaped groove U2, and converting a single-ended signal into a double-ended signal through the first balun 120_a_ does not require additional wiring.

Of course, the setting method of the first balun 120_a_ is not limited thereto. In another embodiment not shown, the two first sidewall structures 124_a_1 and the two second sidewall structures 124_a_2 of the first balun 120_a_ may be further extended downward in FIG. 1C (the opposite direction to the third direction A3). The two first sidewall structures 124_a_1 may be connected by extending toward each other below the first wiring 123_a_, so that the first coupling structure 120_a_1 forms an O-shaped groove. Similarly, the two second sidewall structures 124_a_2 may be connected by extending toward each other below the first wiring 123_a_, so that the second coupling structure 120_a_2 forms another O-shaped groove. The first wiring 123_a_ passes through between the two O-shaped grooves to change the coupling amount of the first balun 120_a_.

In another embodiment not shown, the first balun 120_a_ does not include two first sidewall structures 124_a_1 and two second sidewall structures 124_a_2. The first conductor layer 122_a_1 and the second conductor layer 122_a_2 are disposed between the first wiring 123_a_ and the first radiator 112_a_1. It may be seen that the user may adjust the arrangement of the first coupling structure 120_a_1 and the second coupling structure 120_a_2 according to their needs, so as to improve the performance of the antenna device 100_a_.

The first coupling structure 120_a_1 further includes a first ground port G1 electrically connected to the first conductor layer 122_a_1, and the second coupling structure 120_a_2 further includes a second ground port G2 electrically connected to the second conductor layer 122_a_2. As shown in FIG. 1C, the first ground port G1 is disposed on the side plate 126_a_ and extends away from the first conductor layer 122_a_1 along the third direction A3, and the second ground port G2 is disposed on the side plate 126_a_ and extends away from the second conductor layer 122_a_2 along the third direction A3.

FIG. 1C further shows a first ground layer GL1 of the antenna device 100_a_, and the first ground layer GL1 has an avoidance hole GH1 to avoid the first port 121_a_. The first port 121_a_ is connected to the external circuit through the avoidance hole GH1. The first ground port G1 and the second ground port G2 are connected to the first ground layer GL1.

Here, the first balun 120_a_ further includes two connection rods 128_a_1 and 128_a_2. The connection rod 128_a_1 is provided on the first conductor layer 122_a_1, and the connection rod 128_a_2 is provided on the second conductor layer 122_a_2. The connection rods 128_a_1 and 128_a_2 face away from the side plate 126_a_ along the third direction A3 (that is, face the first radiator 112_a_1 shown in FIG. 1A). The connection rod 128_a_1 is adapted to connect to the first antenna port 114_a_1, and the connection rod 128_a_2 is adapted to connect to the second antenna port 114_a_2.

It may be seen that the first antenna port 114_a_1 (through the connection rod 128_a_1) and the first ground port G1 (through the first sidewall structure 124_a_1) shown in FIG. 1A are electrically connected to the opposite surfaces of the first conductor layer 122_a_1. The second antenna port 114_a_2 (through the connection rod 128_a_2) and the second ground port G2 (through the second sidewall structure 124_a_2) shown in FIG. 1A are electrically connected to opposite surfaces of the second conductor layer 122_a_2.

FIG. 1D is a top view of the antenna device of FIG. 1A. Some elements in FIG. 1D (e.g., the first balun 120_a_) are shown in perspective view, and an auxiliary line C2 passing through a midpoint C1 of the first radiator 112_a_1 is shown as a dotted-chain line. Referring to FIG. 1D, the orthographic projection of each element projected to the first radiator 112_a_1 may be regarded as the orthographic projection of each element projected to the first plane 200_a_. Here, the orthographic projections of the first antenna port 114_a_1 and the second antenna port 114_a_2 projected to the first radiator 112_a_1 (the first plane 200_a_) are symmetrical to the midpoint C1 of the first radiator 112_a_1, and more specifically, symmetrical to the auxiliary line C2. The orthographic projections of the center of the first antenna port 114_a_1 and the center of the second antenna port 114_a_2 projected to the first radiator 112_a_1 (the first plane 200_a_) are the same distance from the midpoint C1 (auxiliary line C2).

As shown in FIG. 1B and FIG. 1D, the first radiator 112_a_1 further includes a first connection portion B1 contacting the first antenna port 114_a_1 and a second connection portion B2 contacting the second antenna port 114_a_2. The orthographic projection of the first connection portion B1 projected to the first radiator 112_a_1 overlaps the orthographic projection of the first antenna port 114_a_1 projected to the first radiator 112_a_1. The orthographic projection of the second connection portion B2 projected to the first radiator 112_a_1 overlaps the orthographic projection of the second antenna port 114_a_2 projected to the first radiator 112_a_1.

The first radiator 112_a_1 has a length L1 along a connection line I of the first connection portion B1 and the second connection portion B2. Here, the connection line I of the first connection portion B1 and the second connection portion B2 is parallel to the first direction A1.

The antenna device 100_a_ is adapted to operate in a radiation frequency band. The length L1 is between 0.4 times and 0.6 times, e.g., 0.5 times, a wavelength belonging to the radiation frequency band. In other words, the size of the first radiator 112_a_1 varies according to the radiation frequency band of the antenna device 100_a_. In addition, the area of the second radiator 112a2 is smaller than that of the first radiator 112a1, but not limited thereto. For example, in other embodiments not shown, the area of the second radiator 112a2 may be greater than or equal to the area of the first radiator 112a1.

The orthographic projection of the first balun 120a on the first plane 200a where the first surface S1 is located overlaps the first surface S1 (FIG. 1B). As shown in FIG. 1D, the orthographic projection of the first coupling structure 120a1 on the first plane 200a and the orthographic projection of the second coupling structure 120a2 on the first plane 200a are both equally divided by the orthographic projection of the first wiring 123a on the first plane 200a. In other words, the orthographic projections of the first coupling structure 120a1 and the second coupling structure 120a2 on the first plane 200a overlap the orthographic projection of the first wiring 123a on the first plane 200a, so that the first balun 120a forms a multi-layer structure.

As shown in FIG. 1D, the first conductor layer 122a1 includes a first side E1 and a second side E2 opposite to each other, and the orthographic projections of the first side E1 and the second side E2 on the first plane 200a both intersect with the orthographic projection of the first wiring 123a on the first plane 200a. The second conductor layer 122a2 includes a third side E3 and a fourth side E4 opposite to each other. The orthographic projections of the third side E3 and the fourth side E4 on the first plane 200a both intersect with the orthographic projection of the first wiring 123a on the first plane 200a. Here, the first side E1, the second side E2, the third side E3 and the fourth side E4 are parallel to each other and extend along the second direction A2. The third side E3 is located between the first side E1 and the fourth side E4.

The orthographic projection of the first antenna port 114a1 on the first plane 200a is close to the orthographic projection of the first side E1 on the first plane 200a. The orthographic projection of the first ground port G1 on the first plane 200a is close to the orthographic projection of the second side E2 on the first plane 200a. The orthographic projection of the second antenna port 114a2 on the first plane 200a is close to the orthographic projection of the third side E3 on the first plane 200a. The orthographic projection of the second ground port G2 on the first plane 200a is close to the orthographic projection of the fourth side E4 on the first plane 200a. In other words, the orthographic projections of the first antenna port 114a1 and the first ground port G1 are located on two opposite sides of the first conductor layer 122a1. The orthographic projections of the second antenna port 114a2 and the second ground port G2 are located on two opposite sides of the second conductor layer 122a2.

The length component L2 of the connection line between the orthographic projection of the first antenna port 114a1 on the first plane 200a and the orthographic projection of the first ground port G1 on the first plane 200a in the first direction A1 is between 0.2 times and 0.3 times, for example, 0.25 times, a wavelength (central wavelength) belonging to the radiation frequency band of the antenna device 100a. The length component L3 of the connection line between the orthographic projection of the second antenna port 114a2 on the first plane 200a and the orthographic projection of the second ground port G2 on the first plane 200a in the first direction A1 is between 0.2 times and 0.3 times, for example, 0.25 times, a wavelength belonging to the radiation frequency band of the antenna device 100a.

Figure 1E:
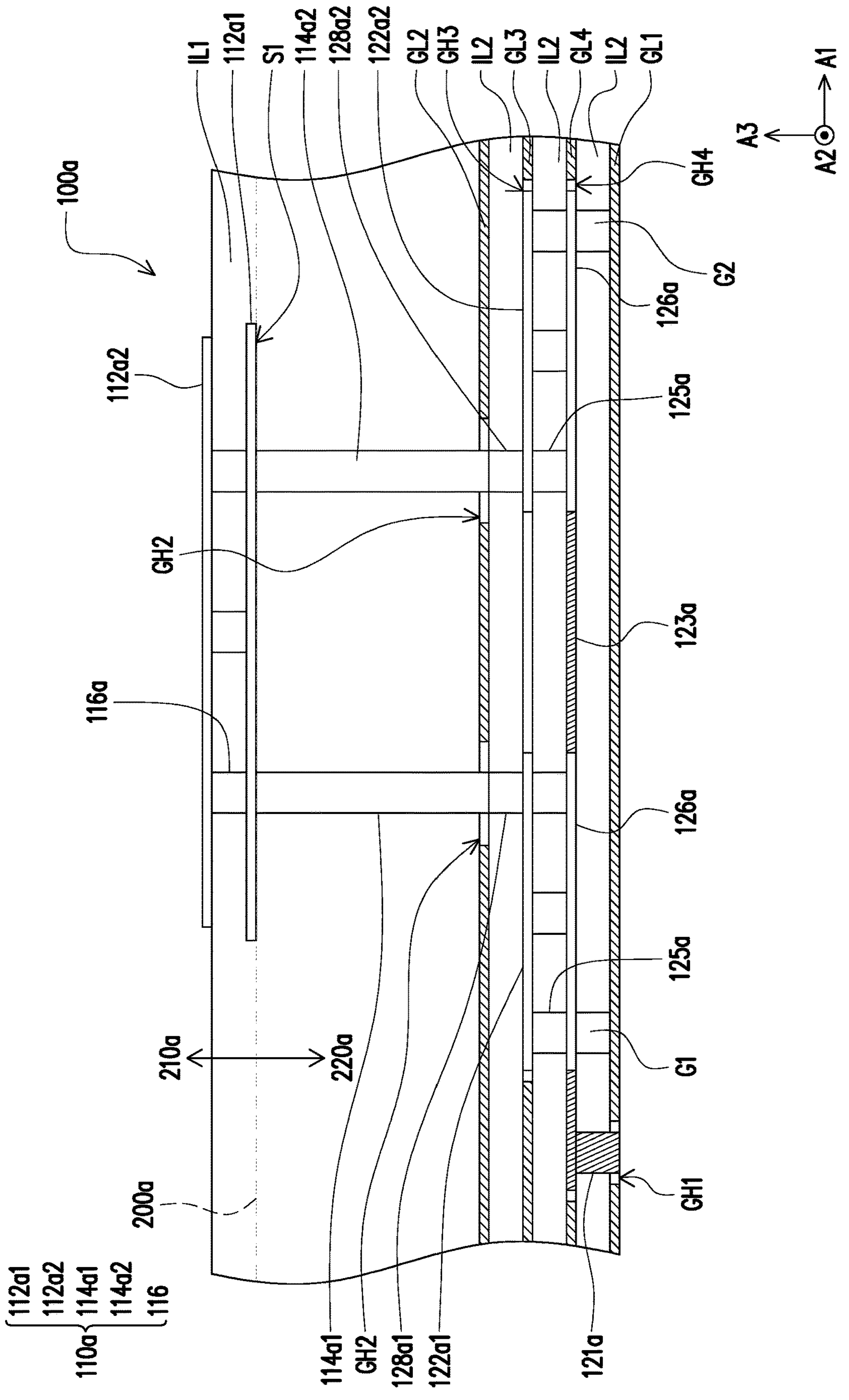
FIG. 1E is a side view of the antenna device of FIG. 1A.
Figure 1F:
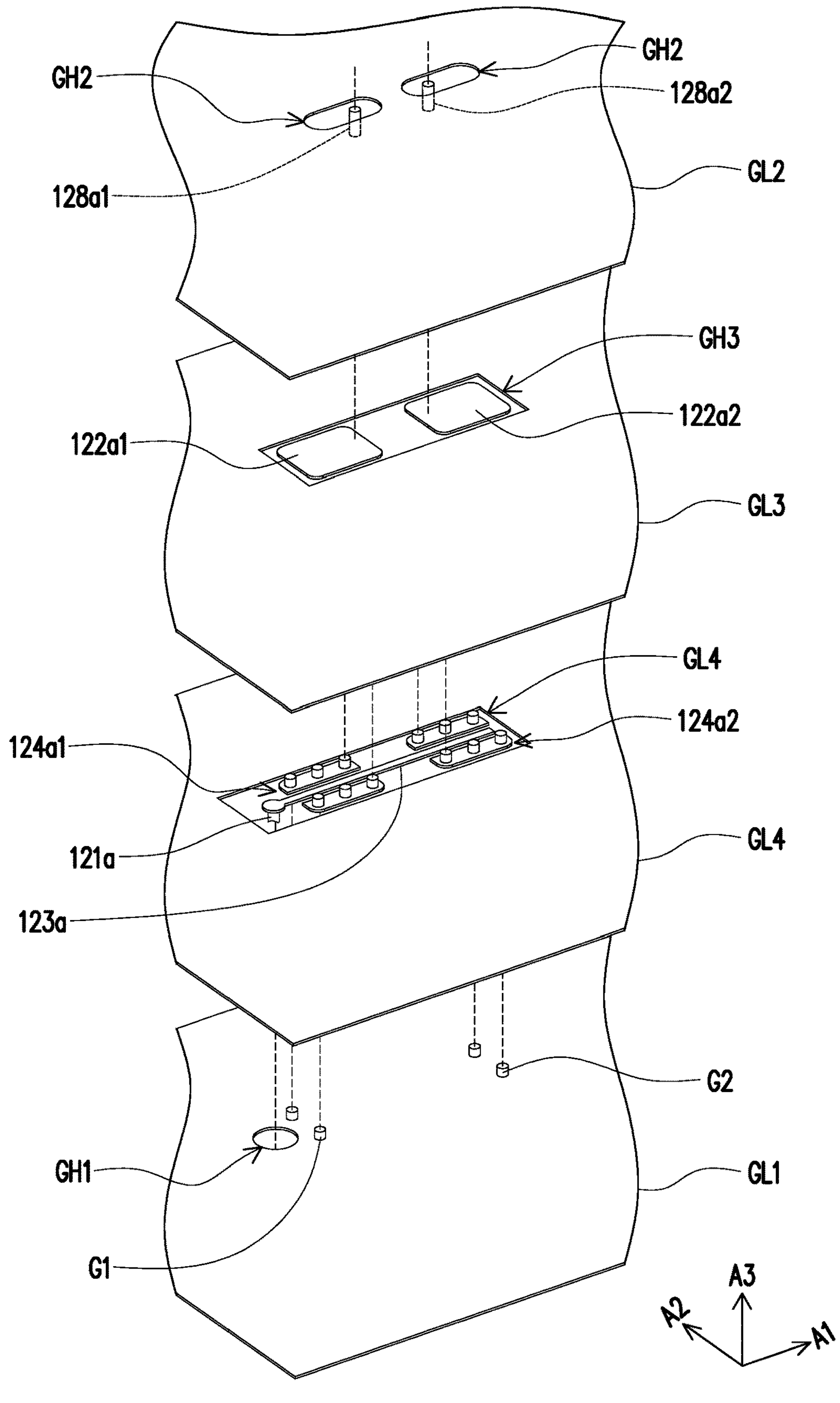
FIG. 1F is an exploded view of some elements of the antenna device of FIG. 1E.

FIG. 1E is a side view of the antenna device of FIG. 1A. FIG. 1F is an exploded view of some elements of the antenna device of FIG. 1E. FIG. 1F is an exploded view of a first ground layer GL1, a second ground layer GL2, a third ground layer GL3, and a fourth ground layer GL4 and the first balun 120a of FIG. 1E, and some elements (e.g., differential antenna 110a) are omitted here for clear description of components.

Referring to FIG. 1E and FIG. 1F, the antenna device 100a further includes a second ground layer GL2 located above the first ground layer GL1, and the first balun 120a is located between the first ground layer GL1 and the second ground layer GL2. Here, the antenna device 100a further includes a third ground layer GL3 and a fourth ground layer GL4.

The third ground layer GL3 is located between the second ground layer GL2 and the fourth ground layer GL4, and the fourth ground layer GL4 is located between the third ground layer GL3 and the first ground layer GL1. An insulating layer IL2 is provided between any two ground layers. Another insulating layer IL1 is further provided on the second ground layer GL2. The first ground port G1 and the second ground port G2 of the first balun 120a are electrically connected to the first ground layer GL1.

The first ground layer GL1, the second ground layer GL2, the third ground layer GL3 and the fourth ground layer GL4 are adapted for shielding external noise, so as to prevent the external noise from interfering with the signal of the antenna device 100a. The user may realize the arrangement of the first ground layer GL1, the second ground layer GL2, the third ground layer GL3 and the fourth ground layer GL4 through the circuit layout of the circuit board (not shown) of the electronic device, and thereby realize the configuration of the antenna device 100a, but the disclosure is not limited thereto.

As shown in FIG. 1F, the second ground layer GL2, the third ground layer GL3 and the fourth ground layer GL4 have a plurality of avoidance holes GH2, GH3, GH4 respectively to avoid various elements of the first balun 120a. In other words, the second ground layer GL2, the third ground layer GL3 and the fourth ground layer GL4 are not in contact with the first balun 120a to avoid causing failure of the first balun 120a. In addition, the first ground layer GL1 has an avoidance hole GH1.

Specifically, the second ground layer GL2 has two avoidance holes GH2 to avoid the two connection rods 128a1 and 128a2. The third ground layer GL3 has an avoidance hole GH3 to avoid the first conductor layer 122a1 and the second conductor layer 122a2. The fourth ground layer GL4 has an avoidance hole GH4 for avoiding the first sidewall structure 124a1, the second sidewall structure 124a2 and the first wiring 123a. The antenna device 100a (see FIG. 1A) is connected to the first ground layer GL1 to be grounded through the first ground port G1 and the second ground port G2. The first port 121a passes through the avoidance hole GH1 and is separated from the first ground layer GL1 by an isolating gap, so as to electrically isolate the first port 121a from the first ground layer GL1. The arrangement of the ground layer and the avoidance hole is not limited thereto, and may be changed according to the arrangement of the first balun 120a.

In addition, as shown in FIG. 1E, the connection rod 128a1 is connected to the first antenna port 114a1, and the connection rod 128a2 is connected to the second antenna port 114a2. Therefore, as shown in FIG. 1D, the orthographic projection of the connection rod 128a1 projected to the first radiator 112a1 overlaps the orthographic projection of the first antenna port 114a1 projected to the first radiator 112a1. The orthographic projection of the connection rod 128a2 projected to the first radiator 112a1 overlaps the orthographic projection of the second antenna port 114_a_2 projected to the first radiator 112_a_1.

Software is adopted in the following to simulate the performance of the antenna device 100_a_ and some elements of the antenna device 100_a_ under different conditions.

Figure 2A:
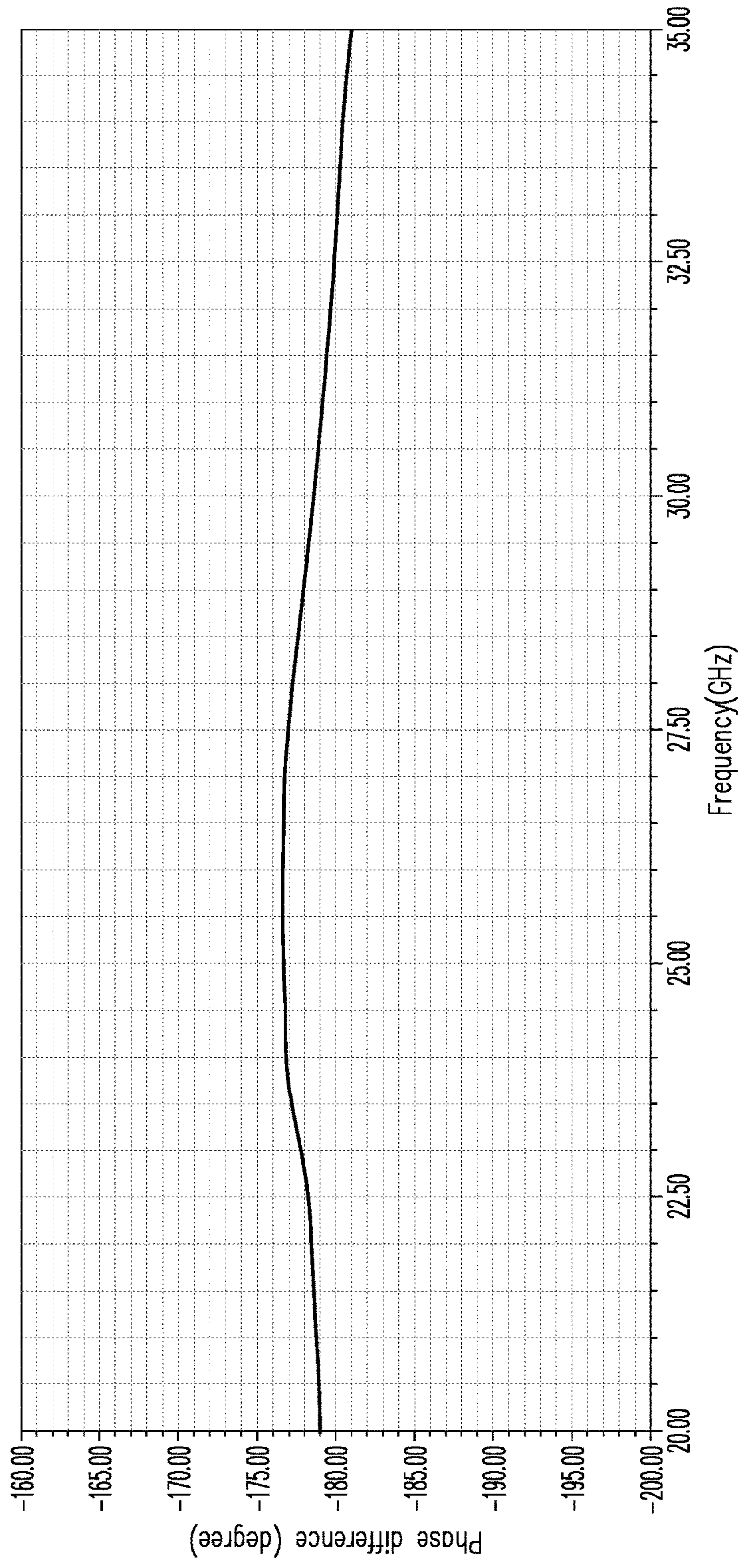
FIG. 2A is a diagram showing the relationship between the frequency and the phase difference of two connection rods of FIG. 1C.

FIG. 2A is a diagram showing the relationship between the frequency and the phase difference of two connection rods of FIG. 1C. Please refer to FIG. 2A, the phase difference between the double-ended signals output to the connection rod 128_a_1 and the connection rod 128_a_2 (see FIG. 1C) through the first balun 120_a_ is simulated here. In the frequency range of 20 GHz to 35 GHz, the phase difference is between −176 degrees and −181 degrees. It may be seen from above that the first balun 120_a_ of the present embodiment has a good performance in converting the single-ended signal and the double-ended signal.

Figure 2B:
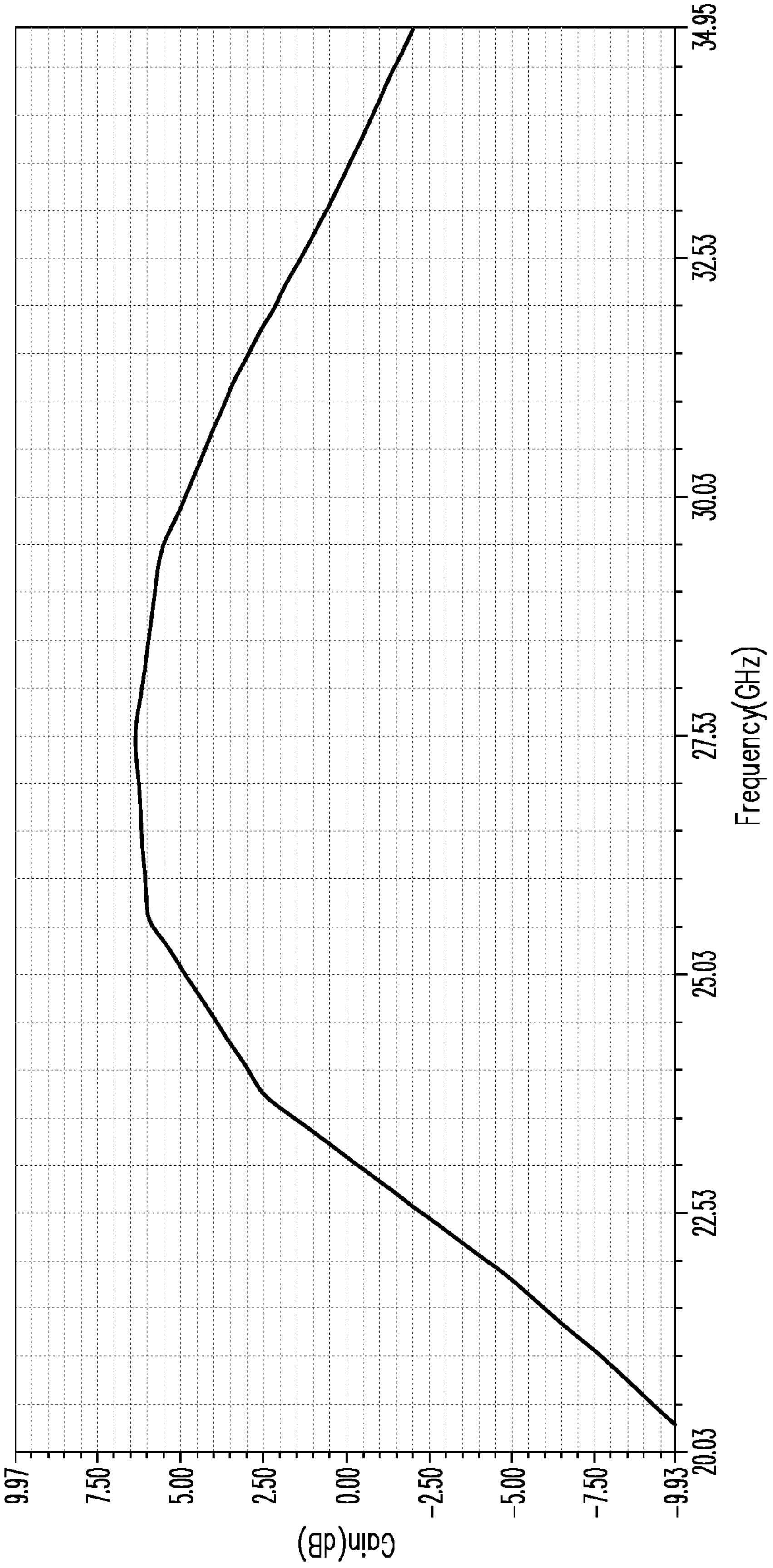
FIG. 2B is a diagram showing the relationship between frequency and gain of the antenna device of FIG. 1A.

FIG. 2B is a diagram showing the relationship between frequency and gain of the antenna device of FIG. 1A. Referring to FIG. 2B, the antenna device 100_a_ of this embodiment has a good gain (gain value greater than 5 dB) at a frequency between 26.5 GHz and 29.5 GHz.

Figure 3A:
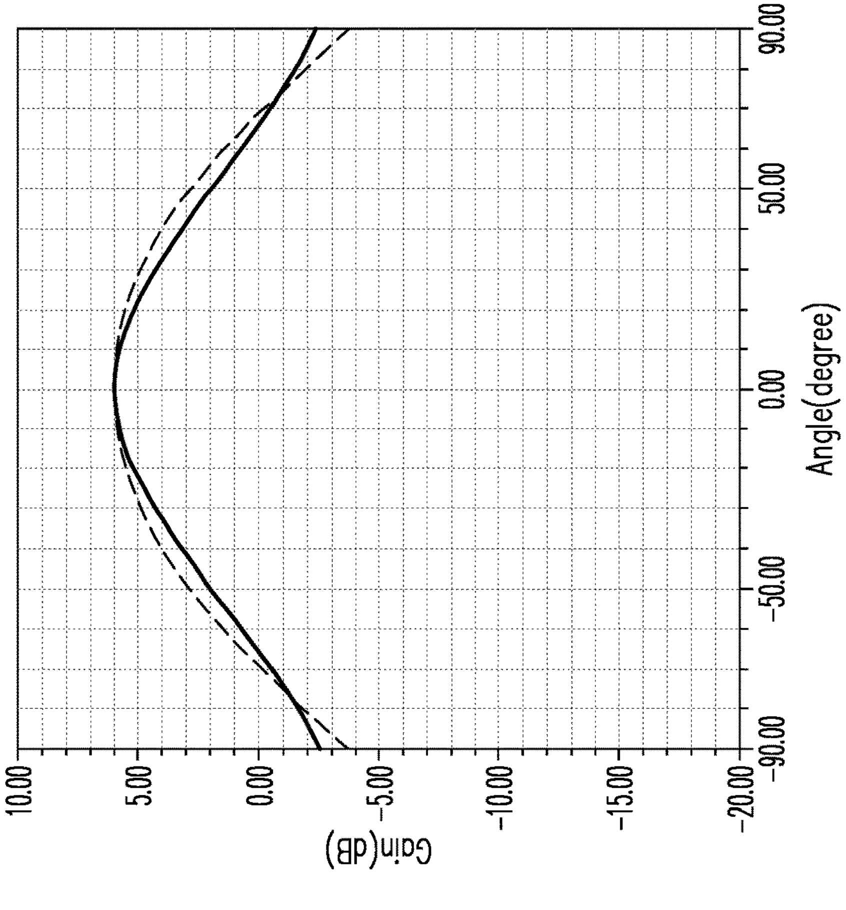
FIG. 3A to FIG. 3C are diagrams respectively illustrating the relationship between angle and gain of the antenna device of FIG. 1A at different frequencies.
Figure 3B:
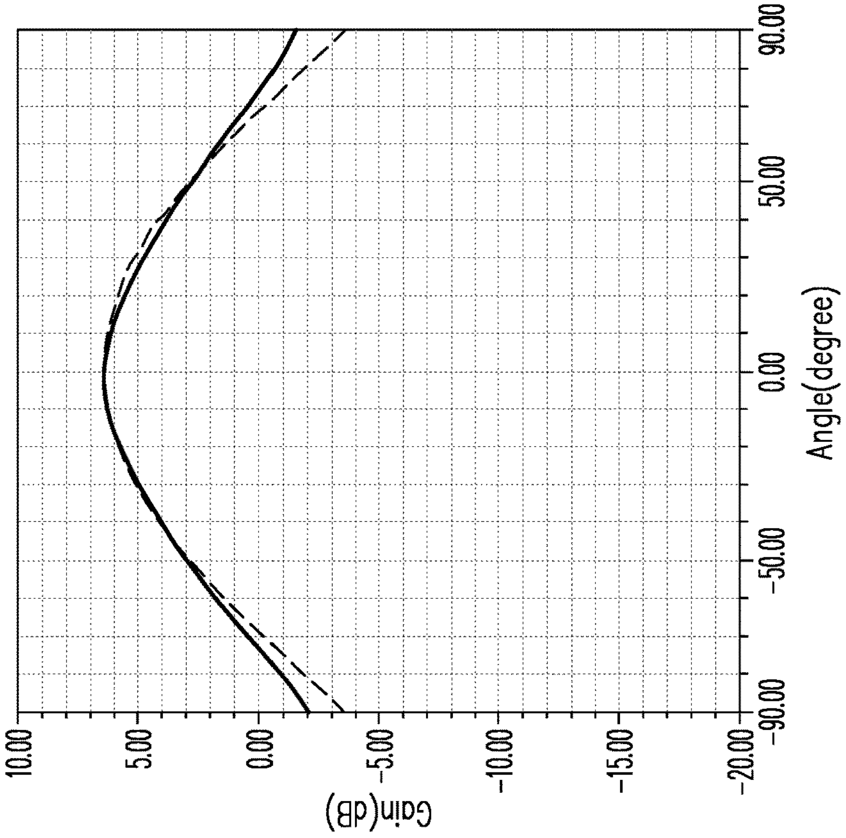
Figure 3C:
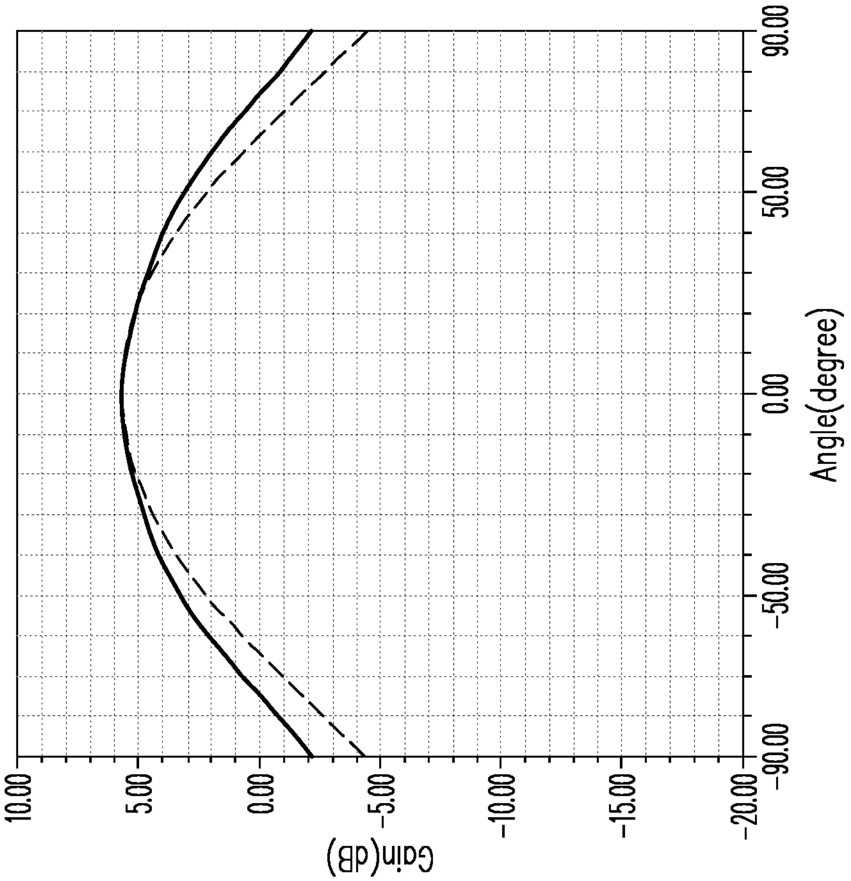

FIG. 3A to FIG. 3C are diagrams respectively illustrating the relationship between angle and gain of the antenna device of FIG. 1A at different frequencies. The solid line represents the angle-gain relationship on the plane of the antenna device 100_a_ along the first direction A1 and the third direction A3, and the dashed line represents the angle-gain relationship on the plane of the antenna device 100_a_ along the second direction A2 and the third direction A3. FIG. 3A to FIG. 3C respectively show the angle-gain relationship diagrams of the antenna device 100_a_ at frequencies of 25.6 GHz, 27.5 GHz, and 29.5 GHz. Please refer to FIG. 3A to FIG. 3C at the same time, the angle-gain relationship of the antenna device 100_a_ has good symmetry and is substantially mirrored. It may be seen from the above that the antenna device 100_a_ of this embodiment maintains good performance.

In short, the first balun 120_a_ has good performance in converting single-ended signal and double-ended signal, and the antenna device 100_a_ may still maintain a good gain value in the case of having the first balun 120_a_ with the multi-layer structure. Moreover, the angle-gain relationship diagram of the antenna device 100_a_ maintains good symmetry.

Figure 4A:
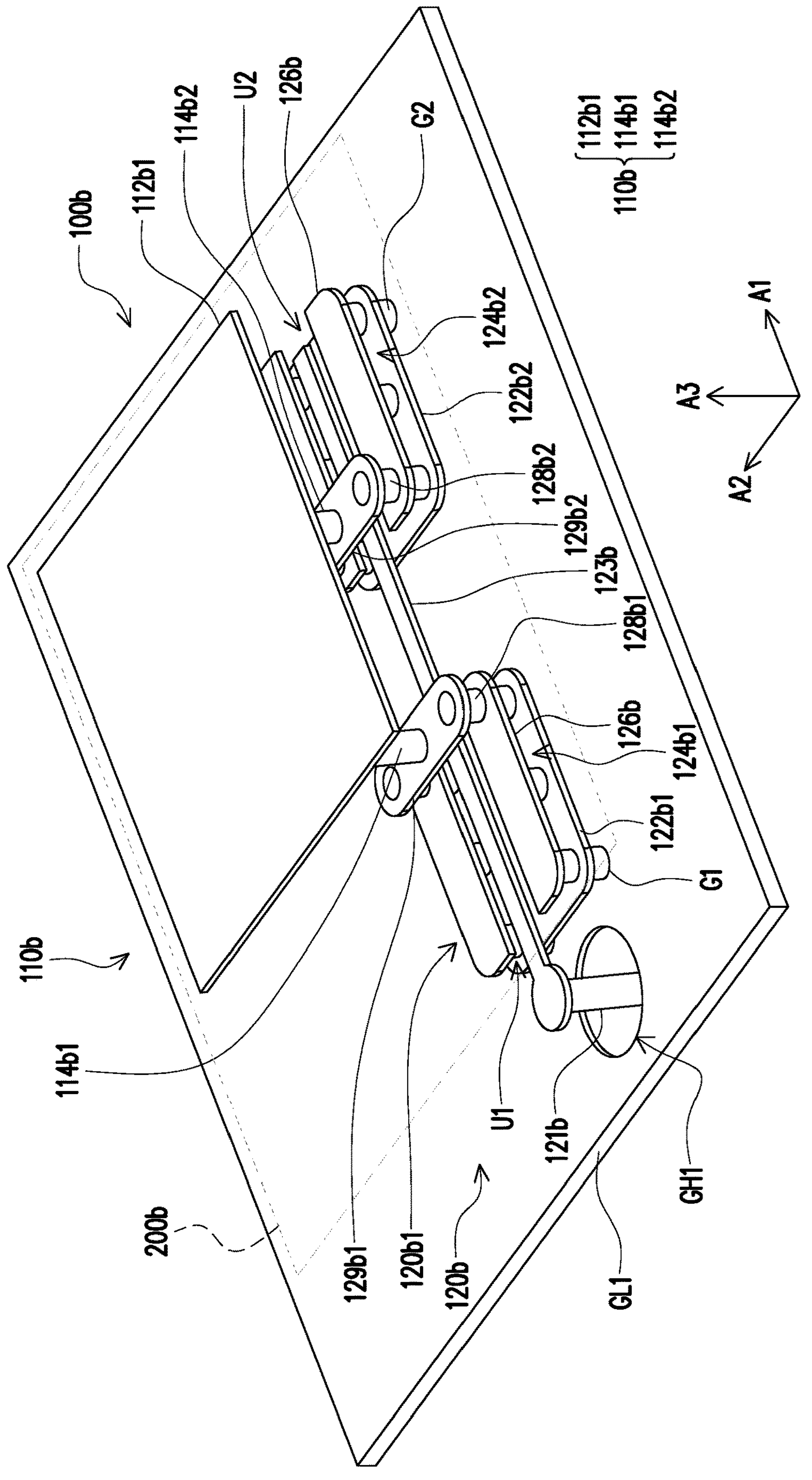
FIG. 4A is a schematic view of an antenna device according to another embodiment of the present disclosure.
Figure 4B:
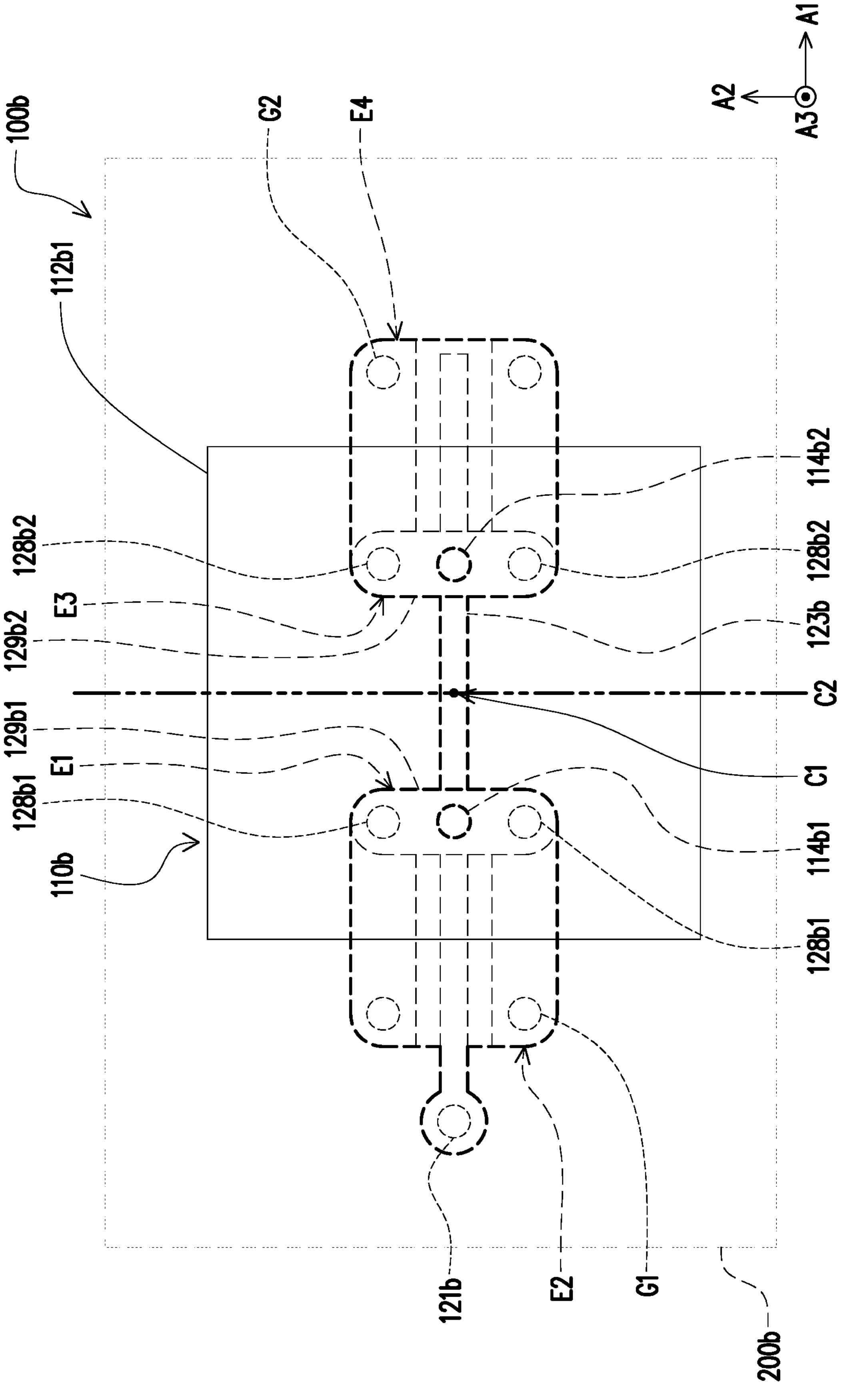
FIG. 4B is a top view of the antenna device of FIG. 4A.
Figure 4C:
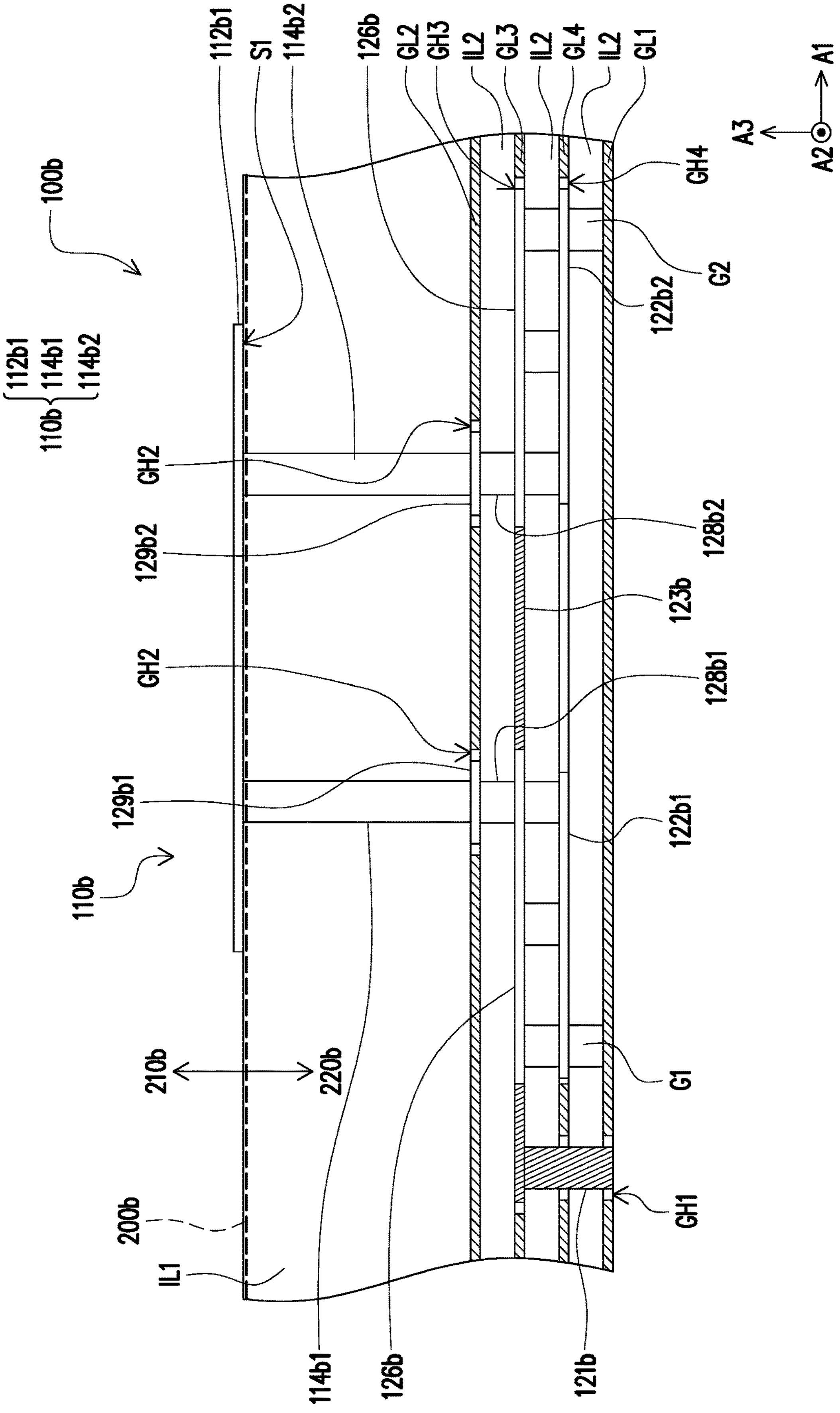
FIG. 4C is a side view of the antenna device of FIG. 4A.

FIG. 4A is a schematic view of an antenna device according to another embodiment of the present disclosure. FIG. 4B is a top view of the antenna device of FIG. 4A. FIG. 4C is a side view of the antenna device of FIG. 4A. In order to clearly show the relative relationship between the structures, some elements in FIG. 4B are shown in perspective view.

Please refer to FIG. 1A and FIG. 4A at the same time, the antenna device 100_b_ of this embodiment is similar to the above-mentioned embodiment, and the difference between the two is: the openings of the first U-shaped groove U1 and the second U-shaped groove U2 of the first balun 120_b_ of this embodiment face the first radiator 112_b_1. The first wiring 123_b_ is located between the first conductor layer 122_b_1 and the first radiator 112_b_1, and between the second conductor layer 122_b_2 and the first radiator 112_b_1. Moreover, the radiator (the first radiator 112_b_1) of the differential antenna 110_b_ of the present embodiment has a single-layer structure and does not include the second radiator 112_a_2 and these vias 116_a_ (see FIG. 1B).

Under the circumstances, the first ground port G1 is provided on the first conductor layer 122_b_1, and the second ground port G2 is provided on the second conductor layer 122_b_2. The two connection rods 128_b_1 are respectively disposed on the two side plates 126_b_ of the two first sidewall structures 124_b_1, and the two connection rods 128_b_2 are respectively disposed on the two side plates 126_b_ of the two second sidewall structures 124_b_2. Additionally, the first balun 120_b_ further includes two connection plates 129_b_1 and 129_b_2. One of the connection plates 129_b_1 is connected to the two connection rods 128_b_1 and the first antenna port 114_b_1. The other connection plate 129_b_2 is connected to the two connection rods 128_b_2 and the second antenna port 114_b_2.

Please refer to FIG. 4B, the orthographic projection of the first antenna port 114_b_1 projected to the first plane 200_b_ is located on the connection line of the orthographic projections of the two connection rods 128_b_1 projected to the first plane 200_b_. The orthographic projection of the second antenna port 114_b_2 projected to the first plane 200_b_ is located on the connection line of the orthographic projections of the two connection rods 128_b_2 projected to the first plane 200_b_.

Please refer to FIG. 1C and FIG. 4C at the same time, the arrangement of the first wiring 123_b_ in this embodiment is similar to the above-mentioned embodiment, the difference between the two is that the first wiring 123_b_ in this embodiment is located in the avoidance hole GH3 of the third ground layer GL3.

Figure 5:
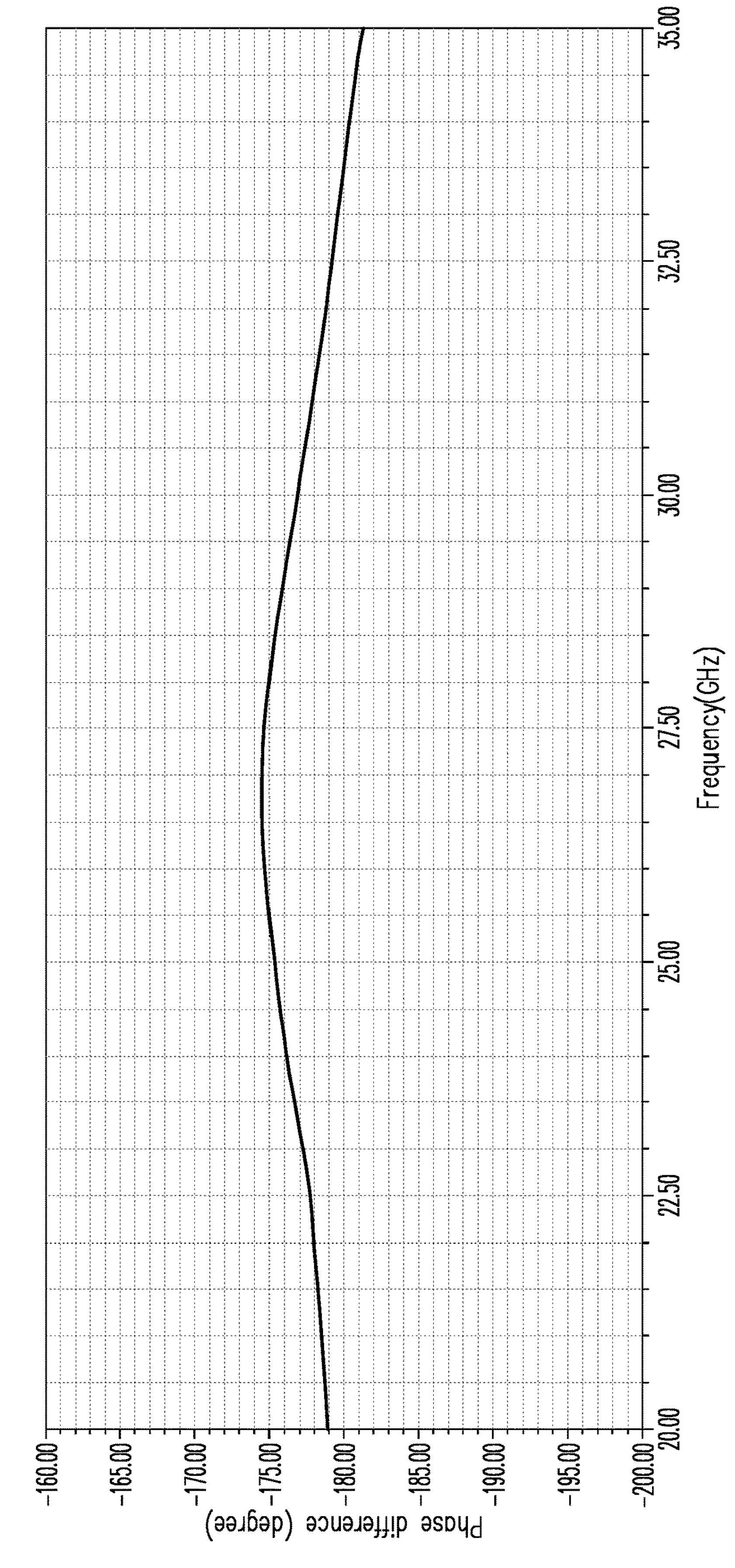
FIG. 5 is a diagram showing the relationship between frequency and phase difference of two connection plates of FIG. 4A.

FIG. 5 is a diagram showing the relationship between frequency and phase difference of two connection plates of FIG. 4A. The phase difference between the two-ended signals output to the connection plate 129_b_1 and the connection plate 129_b_2 (see FIG. 4A) through the first balun 120_b_ is simulated by software. Referring to FIG. 5, in the frequency range of 20 GHz to 35 GHz, the phase difference is between −174 degrees and −182 degrees. It may be seen from the above that the first balun 120_b_ of the present embodiment has a good performance in converting the single-ended signal and the double-ended signal. Therefore, the antenna device 100_b_ of this embodiment has similar functions to the above-mentioned embodiments, and details are not described herein again.

Figure 6A:
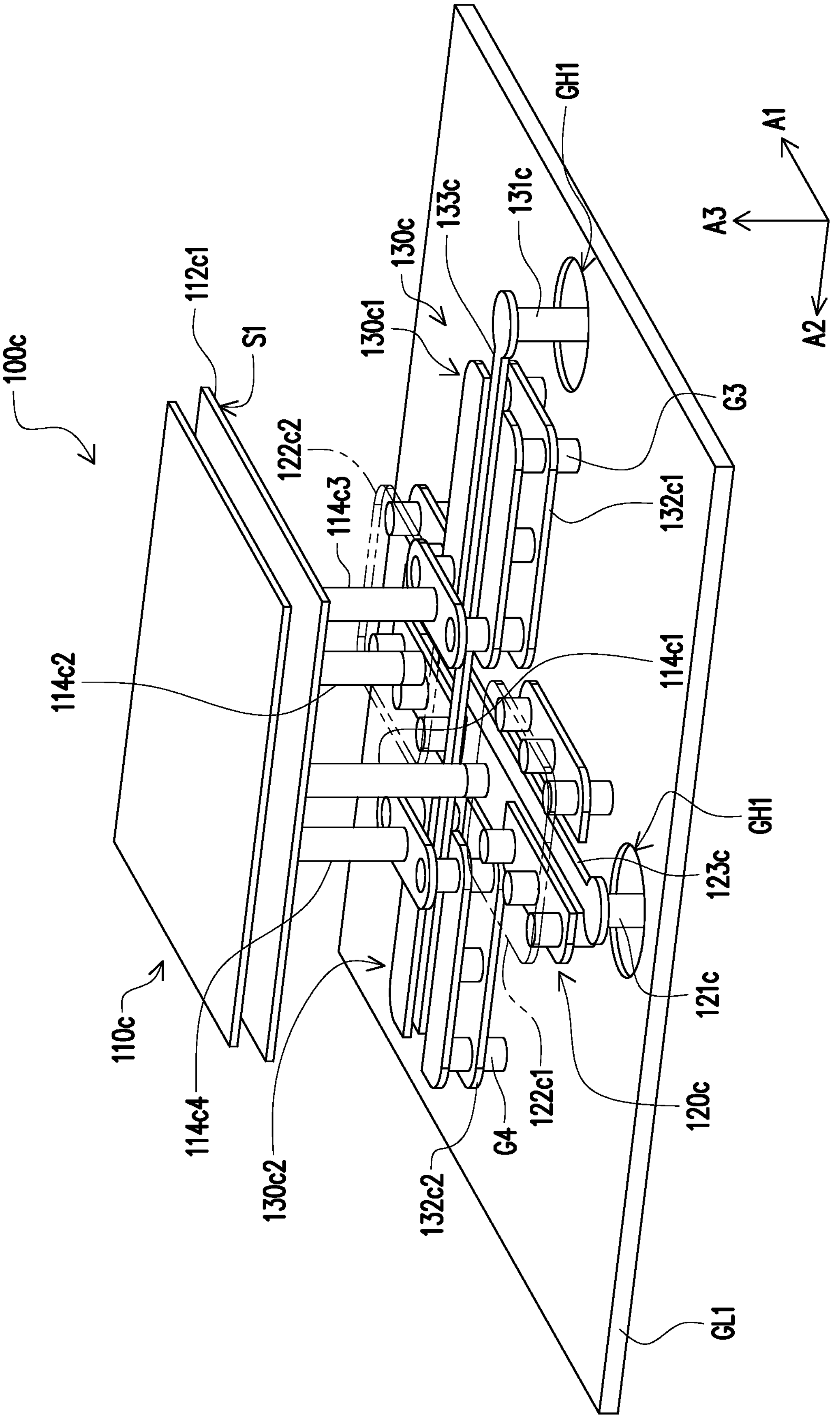
FIG. 6A is a schematic view of an antenna device according to an embodiment of the present disclosure.
Figure 6B:
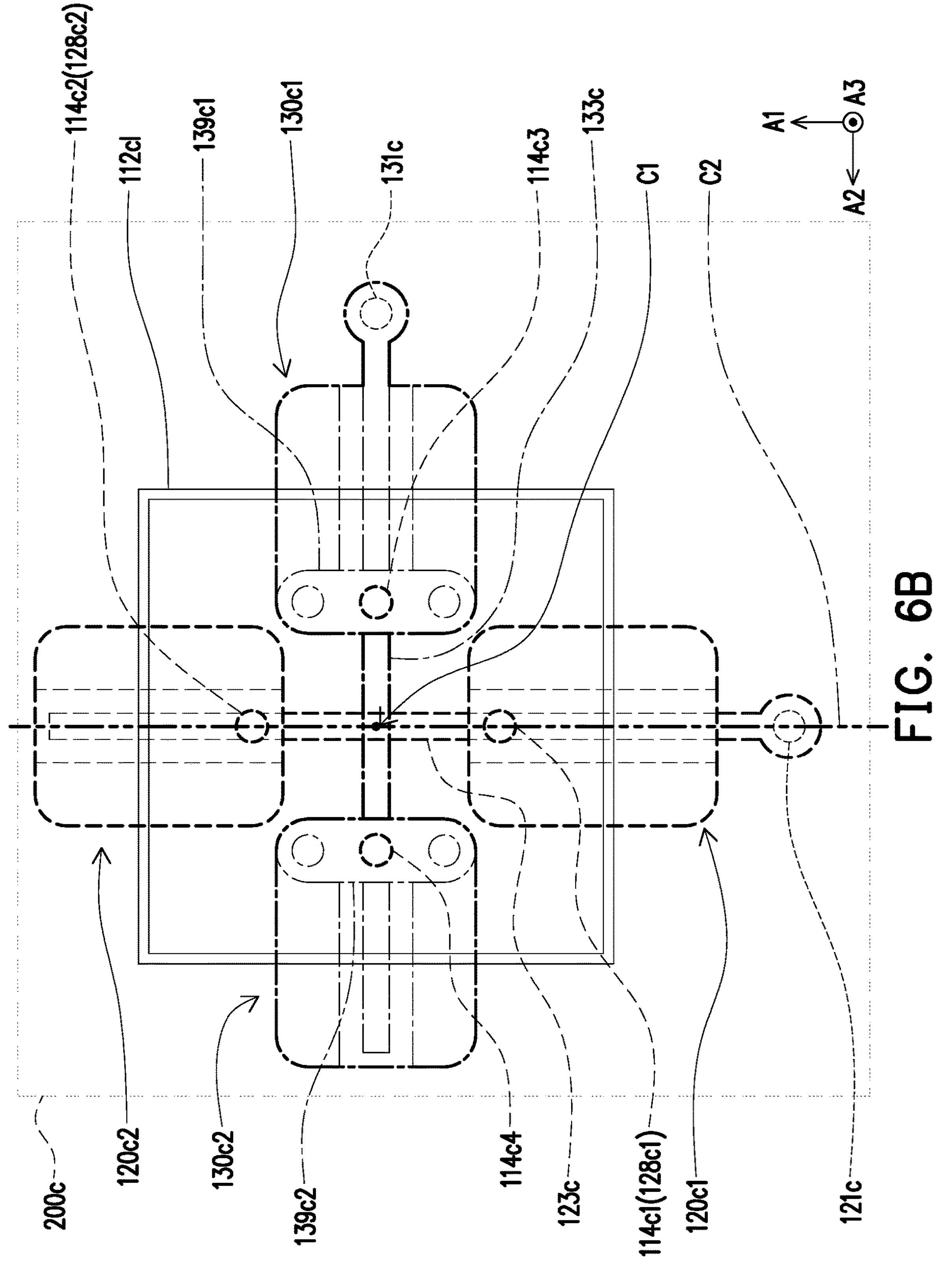
FIG. 6B is a top view of the antenna device of FIG. 6A.
Figure 6C:
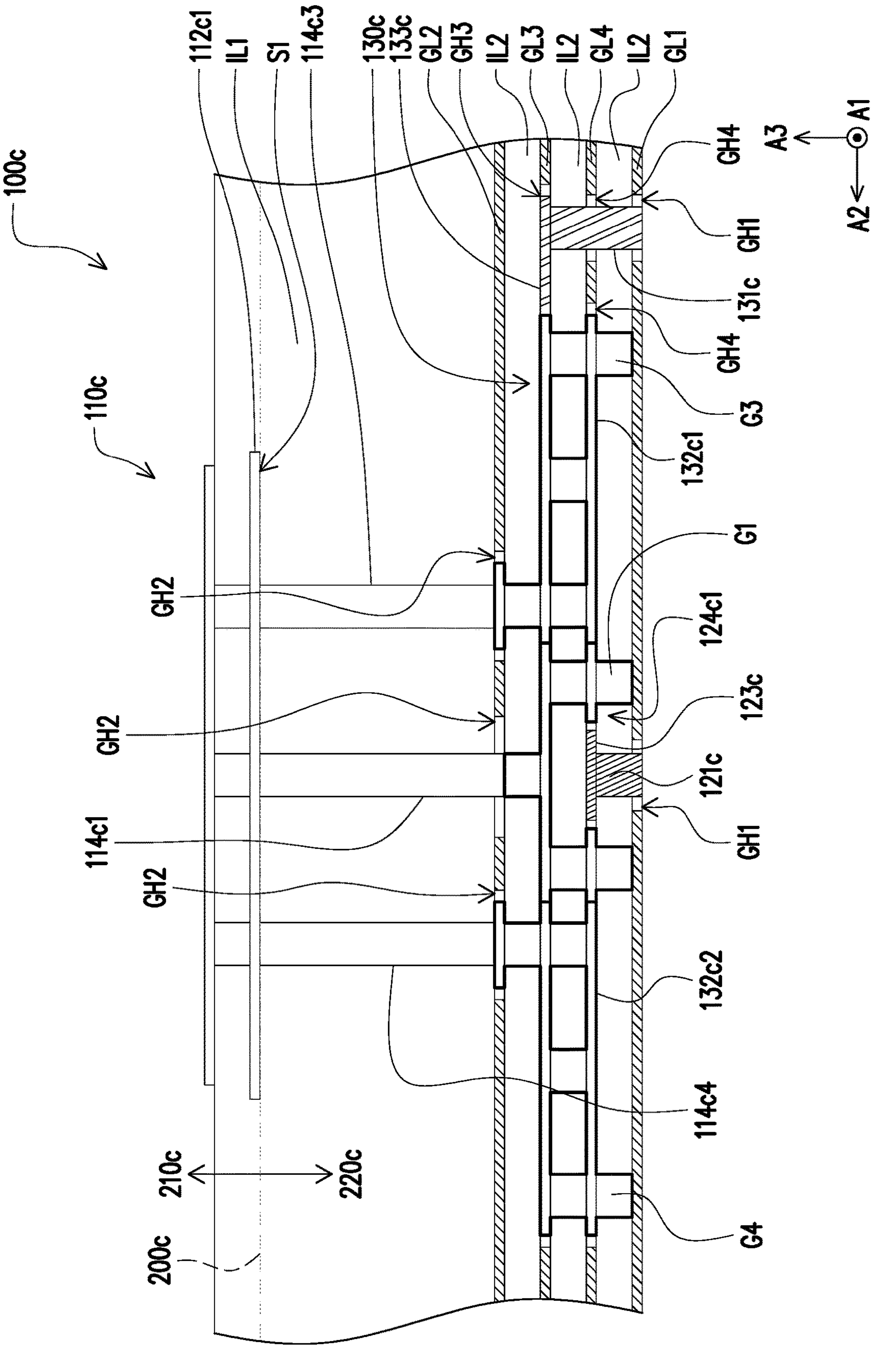
FIG. 6C is a side view of the antenna device of FIG. 6A.

FIG. 6A is a schematic view of an antenna device according to an embodiment of the present disclosure. FIG. 6B is a top view of the antenna device of FIG. 6A. FIG. 6C is a side view of the antenna device of FIG. 6A. In order to clearly show the relative relationship between the structures, some elements in FIG. 6A and FIG. 6B are shown in perspective view.

Please refer to FIG. 6A to FIG. 6B at the same time, the first balun 120_c_ of this embodiment has a structure similar to that of the first balun 120_a_ shown in FIG. 1A. The first conductor layer 122_c_1 and the second conductor layer 122_c_2 are located between the first wiring 123_c_ and the first radiator 112_c_1.

Here, the differential antenna 110_c_ further includes a third antenna port 114_c_3 and a fourth antenna port 114_c_4. The antenna device 100_c_ further includes a second balun 130_c_, and the third antenna port 114_c_3 and the fourth antenna port 114_c_4 are electrically connected to the second balun 130_c_.

The third antenna port 114_c_3 and the fourth antenna port 114_c_4 are connected to the first surface S1 of the first radiator 112_c_1. As shown in FIG. 6B, the orthographic projections of the third antenna port 114_c_3 and the fourth antenna port 114_c_4 projected to the first radiator 112_c_1 are symmetrical to the midpoint C1 of the first radiator 112_c_1, more specifically, symmetrical to the auxiliary line C2 passing through the midpoint C1. Here, the distances from the midpoint C1 to the centers of the first antenna port 114_c_1, the second antenna port 114_c_2, the third antenna port 114_c_3 and the fourth antenna port 114_c_4 are equal, but the disclosure is not limited thereto.

The first balun 120_c_ and the second balun 130_c_ are located on the same side of the first surface S1 of the first radiator 112_c_1 (that is, in the second region 220_c_ as shown in FIG. 6C). As shown in FIG. 6A, the second balun 130_c_ includes a second port 131_c_, a second wiring 133_c_, a third coupling structure 130_c_1 and a fourth coupling structure 130_c_2.

The second wiring 133_c_ is connected to the second port 131_c_ and extends along the second direction A2. The third coupling structure 130_c_1 is electrically connected to the third antenna port 114_c_3. The fourth coupling structure 130_c_2 is electrically connected to the fourth antenna port 114_c_4. The third coupling structure 130_c_1 is located between the fourth coupling structure 130_c_2 and the second port 131_c_. Neither the third coupling structure 130_c_1 nor the fourth coupling structure 130_c_2 directly contacts the second wiring 133_c_. The second wiring 133_c_ is located between the third conductor layer 132_c_1 and the first radiator 112_c_1, and between the fourth conductor layer 132_c_2 and the first radiator 112_c_1.

It can be seen from the above that the second balun 130_c_ of this embodiment has the same structure as the first balun 120_b_ shown in FIG. 4A. In other words, the balun of the antenna device 100_c_ of this embodiment is a combination of the first balun 120_a_ of FIG. 1A and the first balun 120_b_ of FIG. 4A.

As shown in FIG. 6B, the orthographic projection of the second balun 130_c_ on the first plane 200_c_ where the first surface S1 (see FIG. 6A) is located overlaps the first surface S1. The orthographic projection of the third coupling structure 130_c_1 on the first plane 200_c_ and the orthographic projection of the fourth coupling structure 130_c_2 on the first plane 200_c_ are both equally divided by the orthographic projection of the second wiring 133_c_ on the first plane 200_c_.

The first wiring 123_c_ is partially located between the third coupling structure 130_c_1 and the fourth coupling structure 130_c_2, and the distance between the first wiring 123_c_ and the third coupling structure 130_c_1 is the same as the distance between the first wiring 123_c_ and the fourth coupling structure 130_c_2. The second wiring 133_c_ is partially located between the first coupling structure 120_c_1 and the second coupling structure 120_c_2, and the distance between the second wiring 133_c_ and the first coupling structure 120_c_1 is the same as the distance between the second wiring 133_c_ and the second coupling structure 120_c_2.

It can be seen from the above that the third coupling structure 130_c_1 and the fourth coupling structure 130_c_2 are symmetrically disposed on both sides of the first wiring 123_c_, and the first coupling structure 120_c_1 and the second coupling structure 120_c_2 are symmetrically disposed on both sides of the second wiring 133_c_.

As shown in FIG. 6A and FIG. 6C, the first wiring 123_c_ and the second wiring 133_c_ are located on different planes. The first wiring 123_c_ is located in the avoidance hole GH4 of the fourth ground layer GL4, and the second wiring 133_c_ is located in the avoidance hole GH3 of the third ground layer GL3, so as to prevent the signals of the first wiring 123_c_ and the second wiring 133_c_ from interfering with each other. Moreover, the third coupling structure 130_c_1 includes a third ground port G3, the fourth coupling structure 130_c_2 includes a fourth ground port G4, and the third ground port G3 and the fourth ground port G4 are electrically connected to the first ground layer GL1.

The performance of the first balun 120_c_ and the second balun 130_c_ when not connected to the differential antenna 110_c_ is simulated by software below.

Figure 7A:
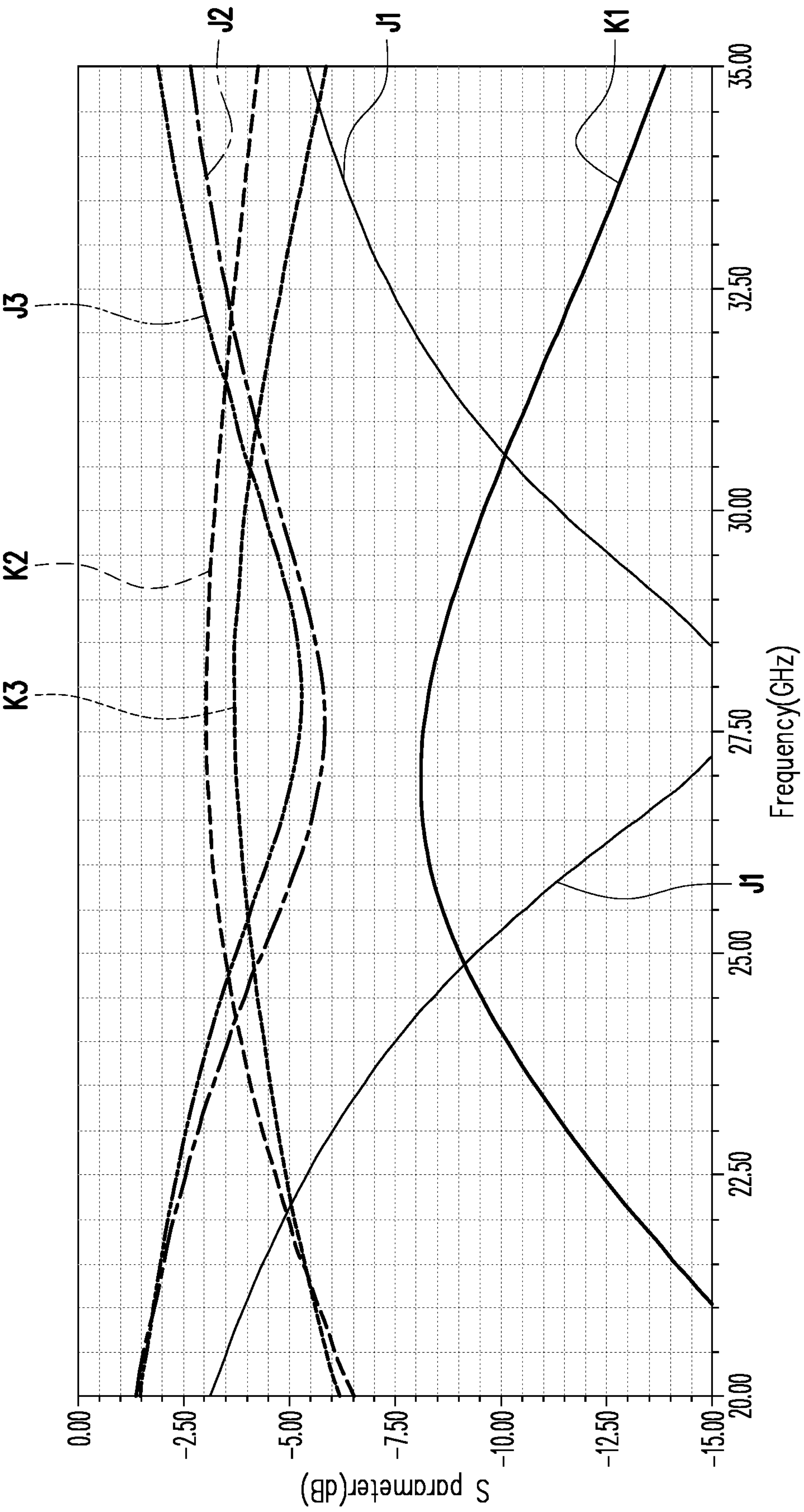
FIG. 7A is a diagram showing the relationship between frequency and S parameter of the first port and the two connection rods of FIG. 6A.

FIG. 7A is a diagram showing the relationship between frequency and S parameter of the first port and the two connection rods of FIG. 6A. Referring to FIG. 7A, the line J1 represents the return loss (S11 parameter) of the first port 121_c_ (see FIG. 6A), the line J2 represents the return loss (S11 parameter) of the connection rod 128_c_1 (see FIG. 6B), and the line J3 represents the return loss (S11 parameter) of the connection rod 128_c_2 (see FIG. 6B). Line K1 represents the degree of isolation between the connection rod 128_c_1 and the connection rod 128_c_2 (S21), line K2 represents the degree of isolation between the first port 121_c_ and the connection rod 128_c_1, and line K3 represents the degree of isolation between the first port 121_c_ and the connection rod 128_c_2.

As shown in FIG. 7A, the first balun 120_c_ has good performance in various characteristics. Especially in the frequency range of 26.5 GHz to 29.5 GHz, the return loss (S11 parameter) of the connection rod 128_c_1 and the connection rod 128_c_2 is relatively low, and the degree of isolation between the first port 121_c_ and the connection rod 128_c_1 and between the first port 121_c_ and the connection rod 128_c_2 is relatively high, so that the first balun 120_c_ has good performance.

Figure 7B:
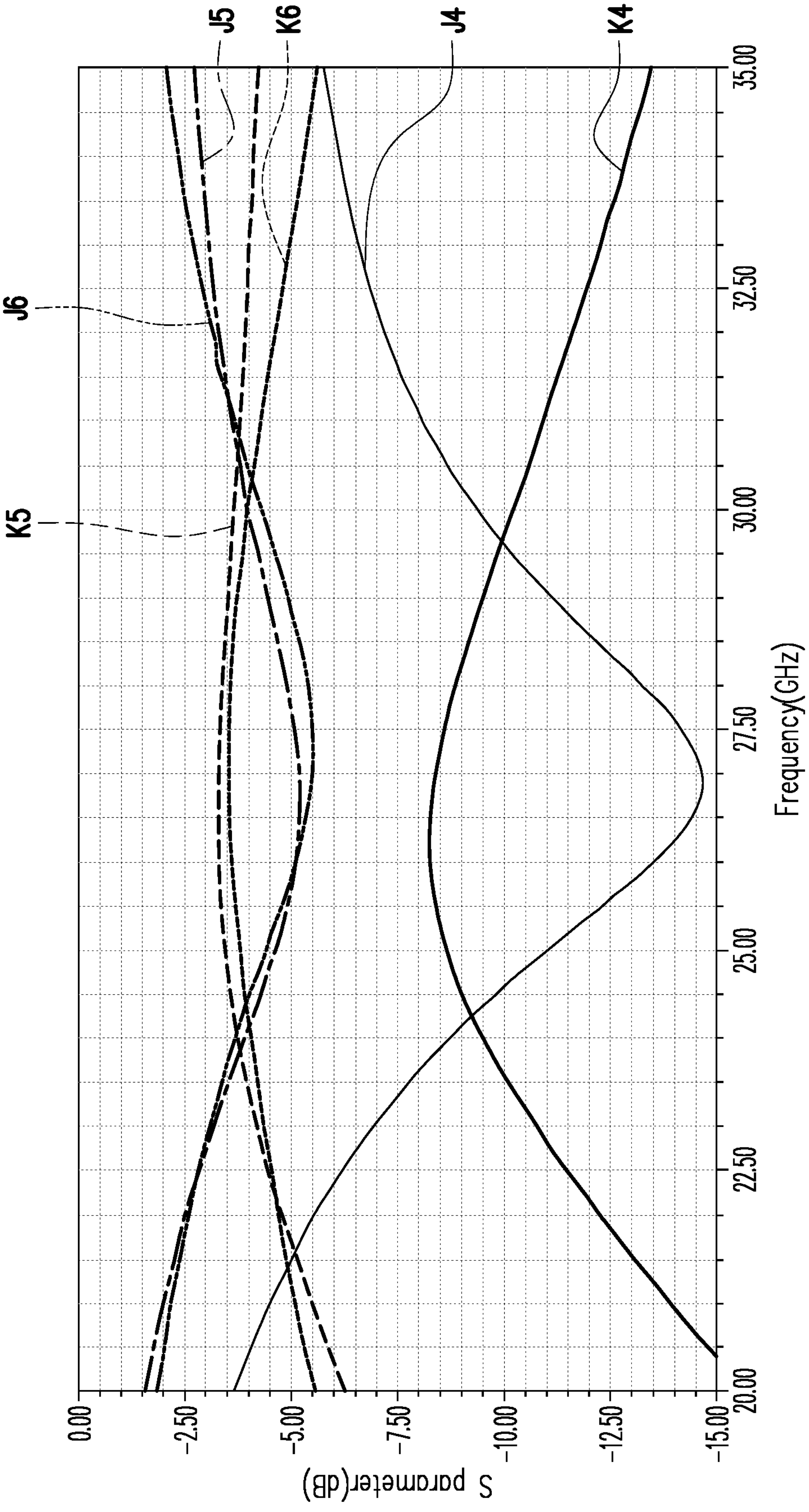
FIG. 7B is a diagram showing the relationship between frequency and S parameter of the second port and the two connection plates of FIG. 6A.

FIG. 7B is a diagram showing the relationship between frequency and S parameter of the second port and the two connection plates of FIG. 6A. Referring to FIG. 7B, the line J4 represents the return loss (S11 parameter) of the second port 131_c_ (see FIG. 6A), the line J5 represents the return loss (S11 parameter) of the connection plate 139_c_1 (see FIG. 6B), and the line J6 represents the return loss (S11 parameter) of the connection plate 139_c_2 (see FIG. 6B). Line K4 represents the degree of isolation between the connection plate 139_c_1 and the connection plate 139_c_2, line K5 represents the degree of isolation between the second port 131_c_ and the connection plate 139_c_1, and line K6 represents the degree of isolation between the second port 131_c_ and the connection plate 139_c_2.

As shown in FIG. 7B, the antenna device 100_c_ has good performance in various characteristics. Especially in the frequency range of 26.5 GHz to 29.5 GHz, the return loss (S11 parameter) of the connection plate 139_c_1 and the connection plate 139_c_2 is relatively low, and the degree of isolation between the second port 131_c_ and the connection plate 139_c_1 and between the second port 131_c_ and the connection plate 139_c_2 is relatively high, so that the second balun 130_c_ has good antenna performance.

Figure 7C:
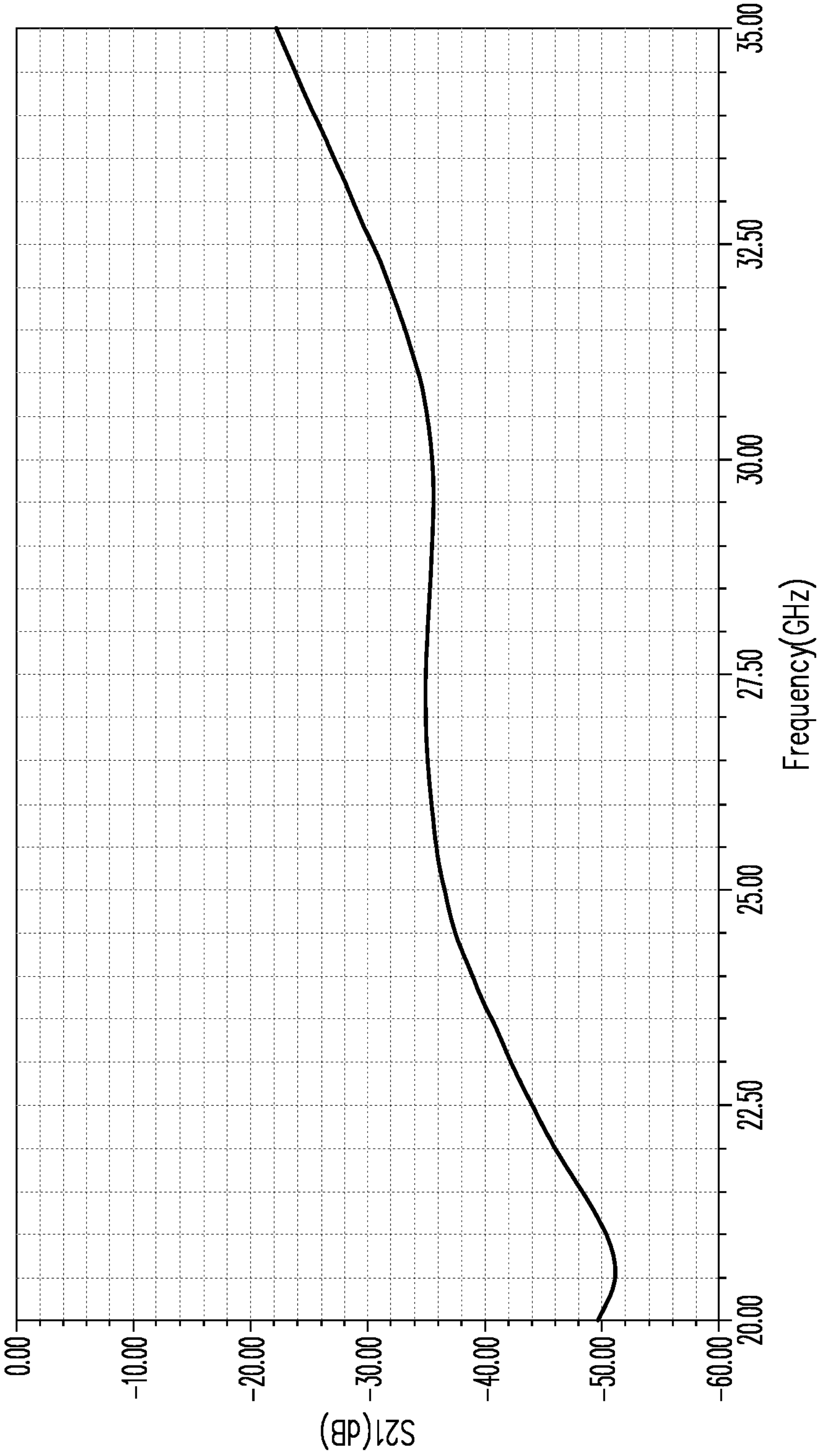
FIG. 7C is a diagram showing the relationship between frequency and S21 of the first port and the second port of FIG. 6A.

FIG. 7C is a diagram showing the relationship between frequency and S21 of the first port and the second port of FIG. 6A. FIG. 7C shows the degree of isolation between the first port 121_c_ and the second port 131_c_ (see FIG. 6A). Referring to FIG. 6A and FIG. 7C at the same time, the degree of isolation between the first port 121_c_ and the second port 131_c_ is substantially and positively correlated with the frequency. The first port 121_c_ and the second port 131_c_ have good isolation to prevent the signals of the first port 121_c_ and the second port 131_c_ from interfering with each other.

Figure 7D:
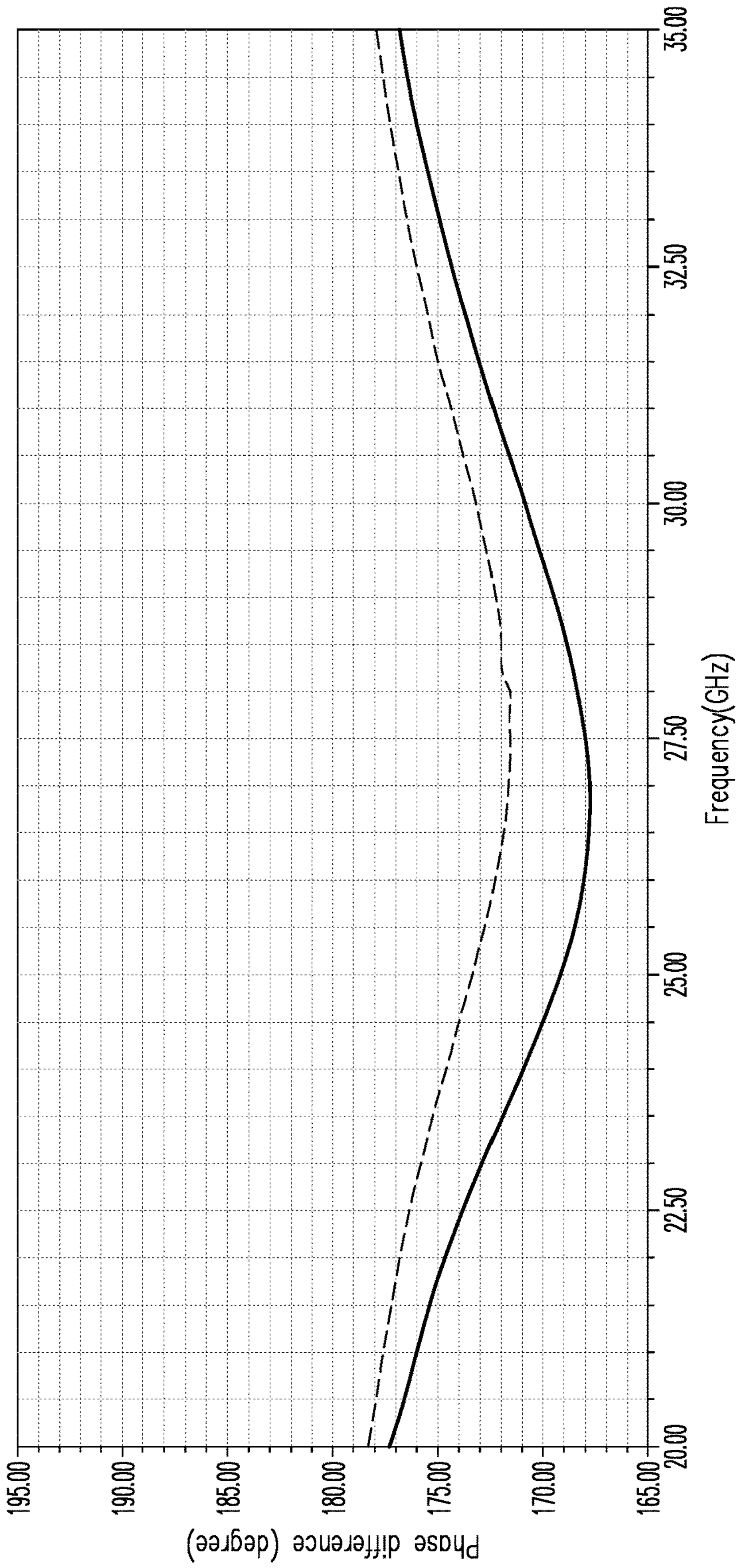
FIG. 7D is a diagram showing the relationship between frequency and phase difference of the two connection rods and the two connection plates of FIG. 6A.

FIG. 7D is a diagram showing the relationship between frequency and phase difference of the two connection rods and the two connection plates of FIG. 6A. Referring to FIG. 7D, the solid line represents the phase difference between the double-ended signals output from the first balun 120_c_ to the connection rod 128_c_1 and the connection rod 128_c_2 (see FIG. 6B), and the value of the phase difference is between 168 degrees and 178 degrees. The dashed line represents the phase difference between the double-ended signals output from the second balun 130*c* to the connection plate 139*c*1 and the connection plate 139*c*2 (see FIG. 6B), and the value of the phase difference is between 171 degrees and 179 degrees.

Please refer to FIG. 2A and FIG. 7D at the same time. Since the first balun 120*c* and the second balun 130*c* (see FIG. 6A) interfere with each other, the range (165 degrees to 180 degrees) of the phase difference (see solid line) between the connection rod 128*c*1 and the connection rod 128*c*2 of FIG. 7D is slightly different from the range of the phase difference (−175 degrees to −185 degrees) shown in FIG. 2A.

Please refer to FIG. 5 and FIG. 7D at the same time, the range (170 degrees to 180 degrees) of the phase difference (see dashed line) between the connection plate 139*c*1 and the connection plate 139*c*2 of FIG. 7D is slightly different from the range (−174 degrees to −181 degrees) of the phase difference shown in FIG. 5.

It may be seen from the above that in the case where the first balun 120*c* and the second balun 130*c* are provided simultaneously, the single-ended signal and double-ended signal conversion functions of the first balun 120*c* and the second balun 130*c* are still well-performed respectively.

The performances of the first balun 120*c* and the second balun 130*c* when connected to the differential antenna 110*c* are simulated by software below. In the simulation, the dielectric constant of the substrate on which the entire circuit is located is 3.38, the spacing between conductor layers is 5 mils (0.001 inches), and the side length of the differential antenna 110*c* shown is 2.3 millimeters (mm). The widths of the first wiring 123*c* and the second wiring 133*c* are both 0.127 mm, the length of the first coupling structure 120*c*1 and the second coupling structure 120*c*2 (parallel to the extending direction of the first wiring 123*c*) is 1.2 mm, the width (orthogonal to the extending direction of the first wiring 123*c*) is 0.9652 mm, the length (parallel to the extending direction of the second wiring 133*c*) of the third coupling structure 130*c*1 and the fourth coupling structure 130*c*2 is 1.2 mm, and the width (orthogonal to the extending direction of the second wiring 133*c*) is 0.9652 mm.

Figure 7E:
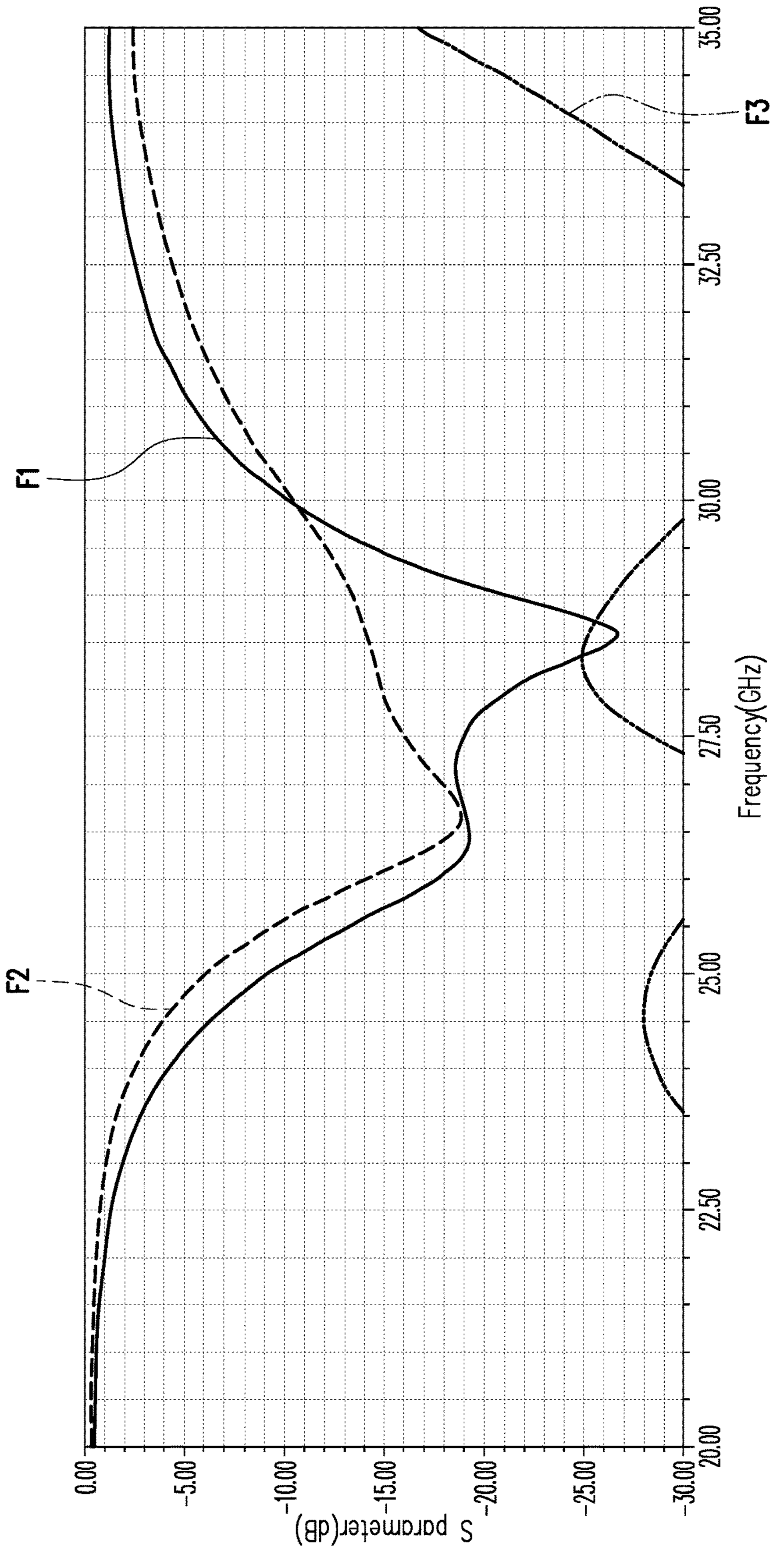
FIG. 7E is a diagram showing the relationship between frequency and S parameter of the first port and the second port of FIG. 6A.

FIG. 7E is a diagram showing the relationship between frequency and S parameter of the first port and the second port of FIG. 6A. Referring to FIG. 7E, the line F1 represents the return loss (S11 parameter) of the first port 121*c* (see FIG. 6A), the line F2 represents the return loss (S11 parameter) of the second port 131*c* (see FIG. 6A), and the line F3 represents the degree of isolation between the first port 121*c* and the second port 131*c*.

Here, the first port 121*c* and the second port 131*c* of the antenna device 100*c* respectively have low return loss (S11 parameter), especially when the frequency range is 26.5 GHz to 29.5 GHz, the return loss (S11 parameter) is below −10 dB, which means that the energy of the first port 121*c* and the second port 131*c* generally enters the antenna device 100*c*, and energy may be saved. In addition, the first port 121*c* and the second port 131*c* have good isolation to avoid signal interference between each other.

Figure 7F:
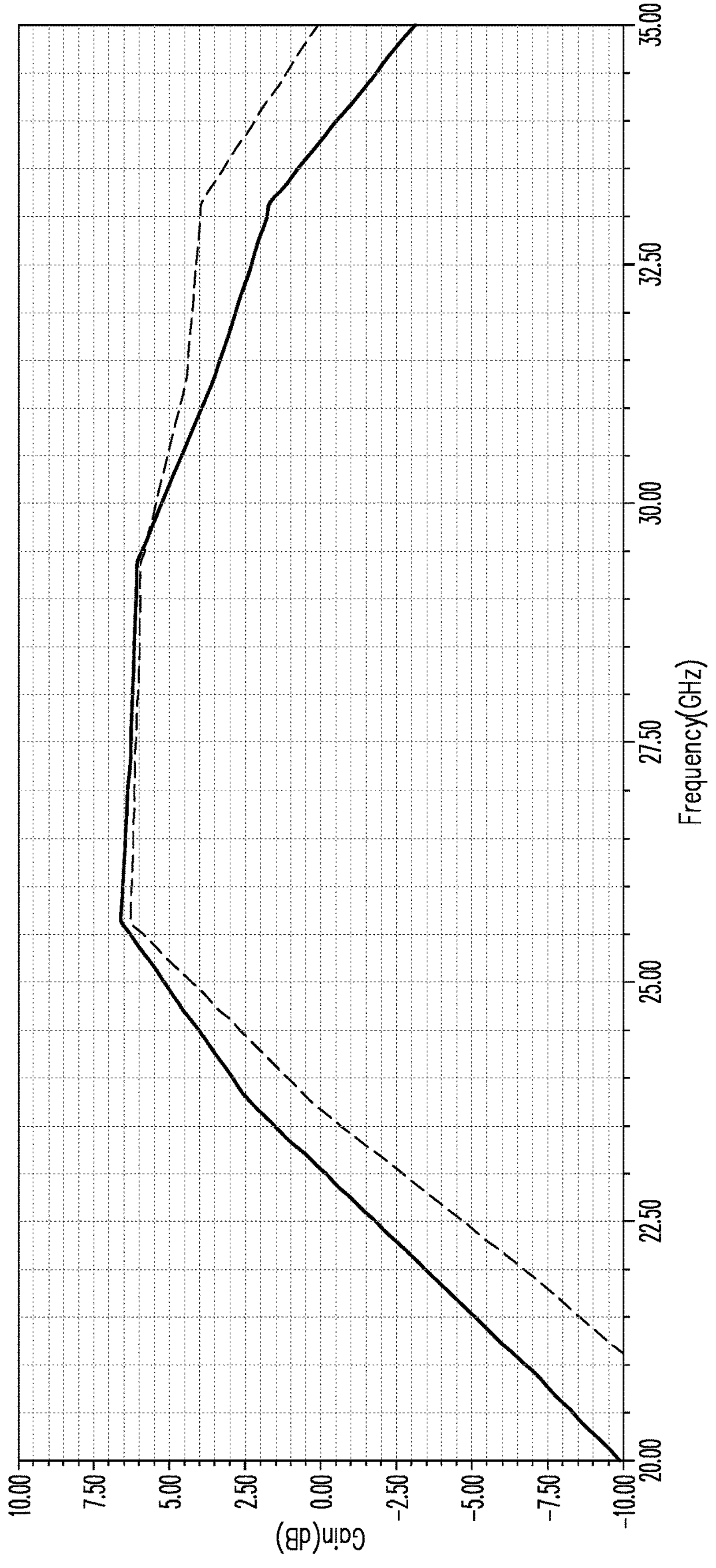
FIG. 7F is a diagram showing the relationship between frequency and gain of the antenna device of FIG. 6A.

FIG. 7F is a diagram showing the relationship between frequency and gain of the antenna device of FIG. 6A. Referring to FIG. 7E, the solid line represents the frequency-gain relationship of the first port 121*c*, and the dashed line represents the frequency-gain relationship of the second port 131*c*. It may be seen that the first port 121*c* and the second port 131*c* have a good performance in the relationship between the frequency and the gain, especially when the frequency range is 26.5 GHz to 29.5 GHz, the gain value is greater than 5 dB.

Figure 8B:
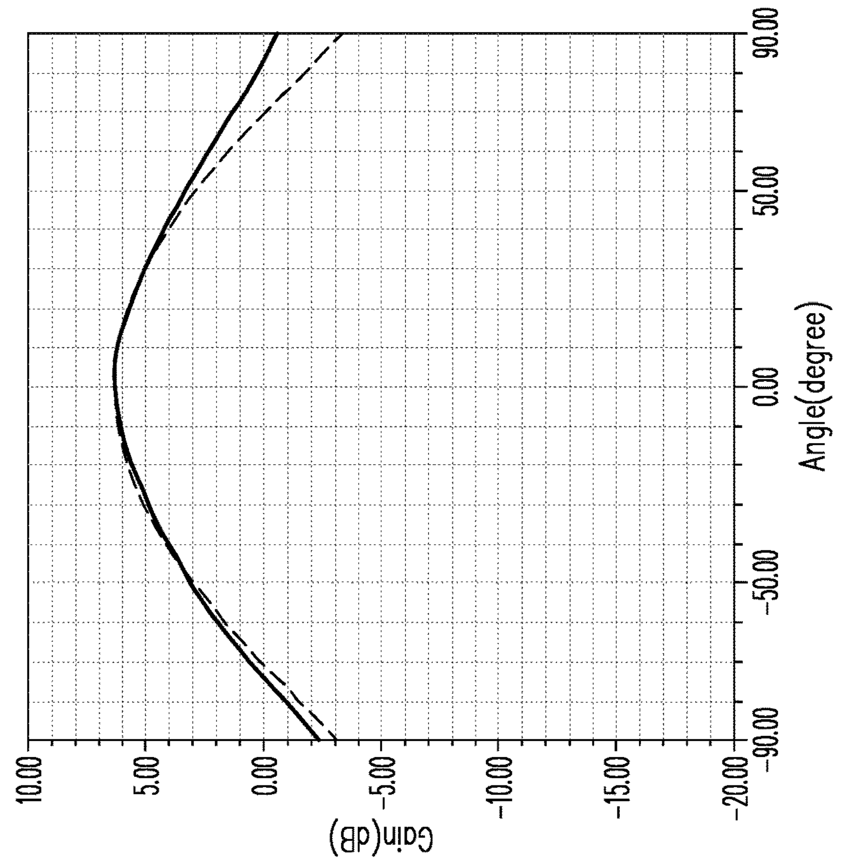
FIG. 8A to FIG. 8C are diagrams respectively illustrating the relationship between angle and gain of the antenna device when the first port of FIG. 6A is activated.
Figure 8A:
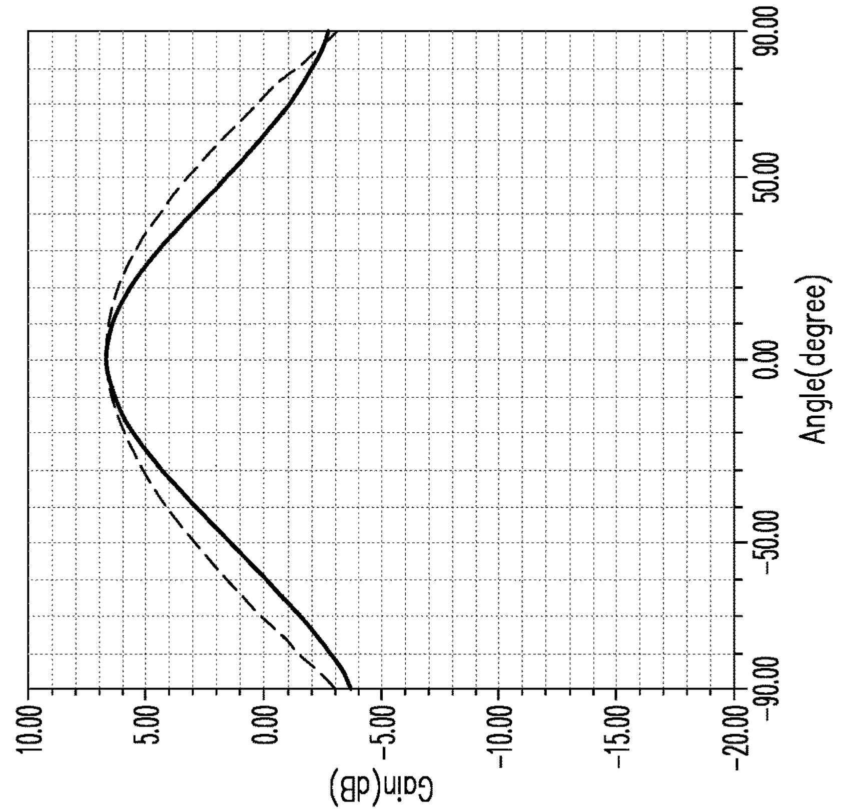
Figure 8C:
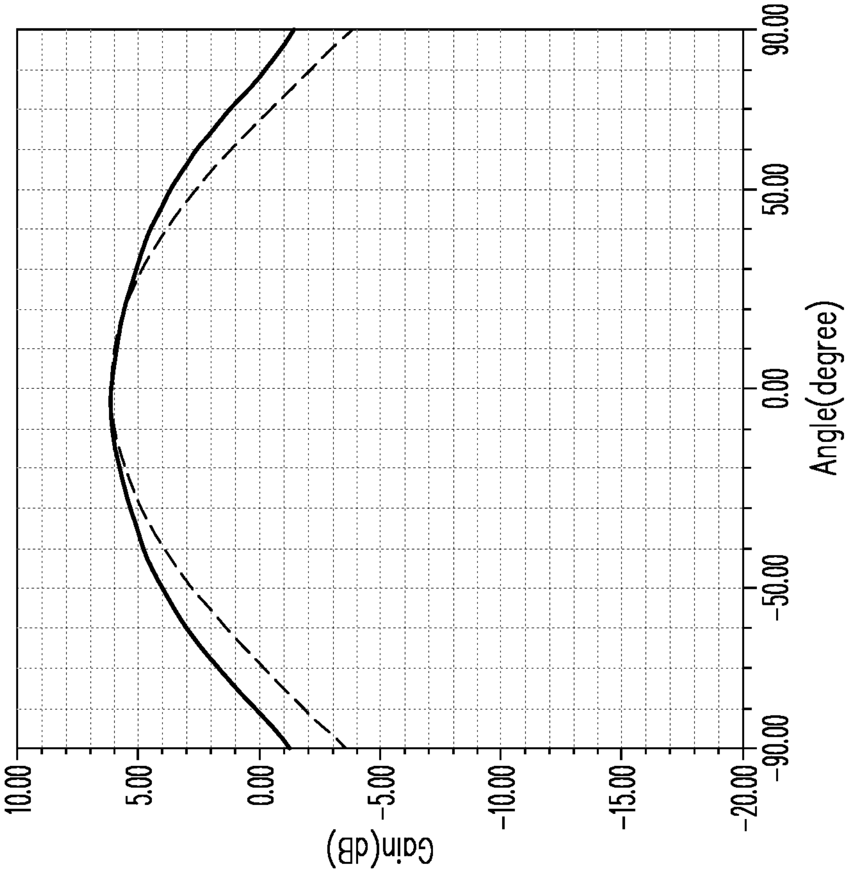

FIG. 8A to FIG. 8C are diagrams respectively illustrating the relationship between angle and gain of the antenna device when the first port of FIG. 6A is activated. FIG. 8A to FIG. 8C respectively show the angle-gain relationship of the antenna device 100*c* of FIG. 6A at frequencies of 26.5 GHz, 27.5 GHz, and 29.5 GHz. Under the circumstances, the first port 121*c* of the antenna device 100*c* is enabled (i.e., the first balun 120*c* is enabled), and the second port 131*c* is disabled (i.e., the second balun 130*c* is disabled).

Please refer to FIG. 8A to FIG. 8C, the solid line represents the angle-gain relationship of the antenna device 100*c* of FIG. 6A on the plane along the first direction A1 and the third direction A3. The dashed line represents the angle-gain relationship of the antenna device 100*c* on the plane along the second direction A2 and the third direction A3. As shown in FIG. 8A to FIG. 8C, under the circumstances, the angle-gain relationship of the antenna device 100*c* is substantially and symmetrically distributed, and it may be seen that the antenna device 100*c* has good performance.

Figure 9B:
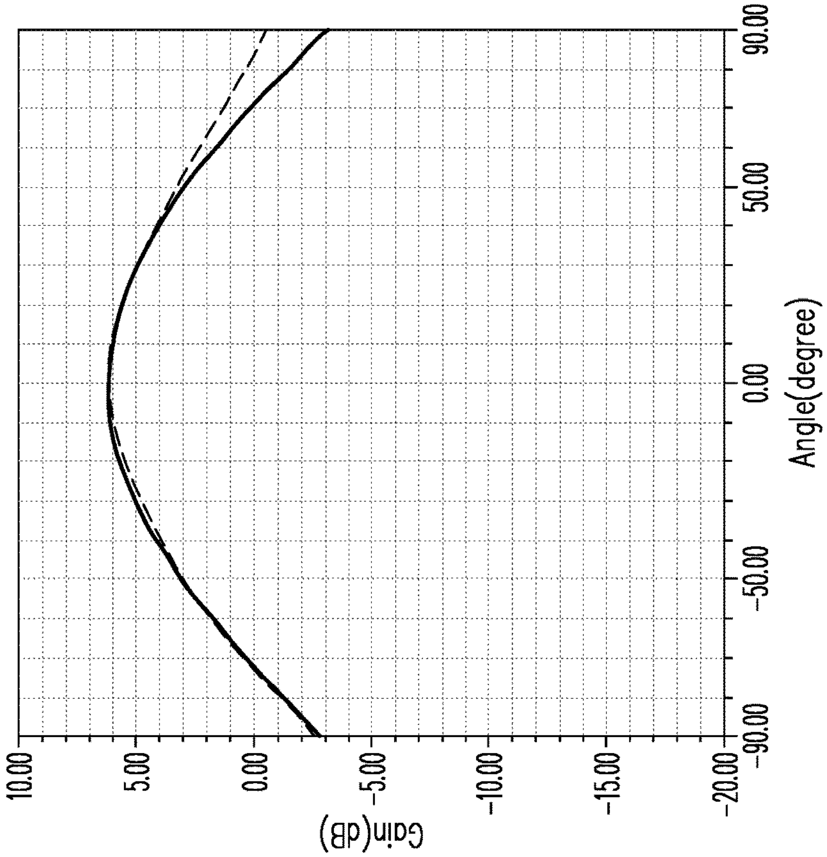
FIG. 9A to FIG. 9C are diagrams respectively illustrating the relationship between angle and gain of the antenna device when the second port of FIG. 6A is activated.
Figure 9A:
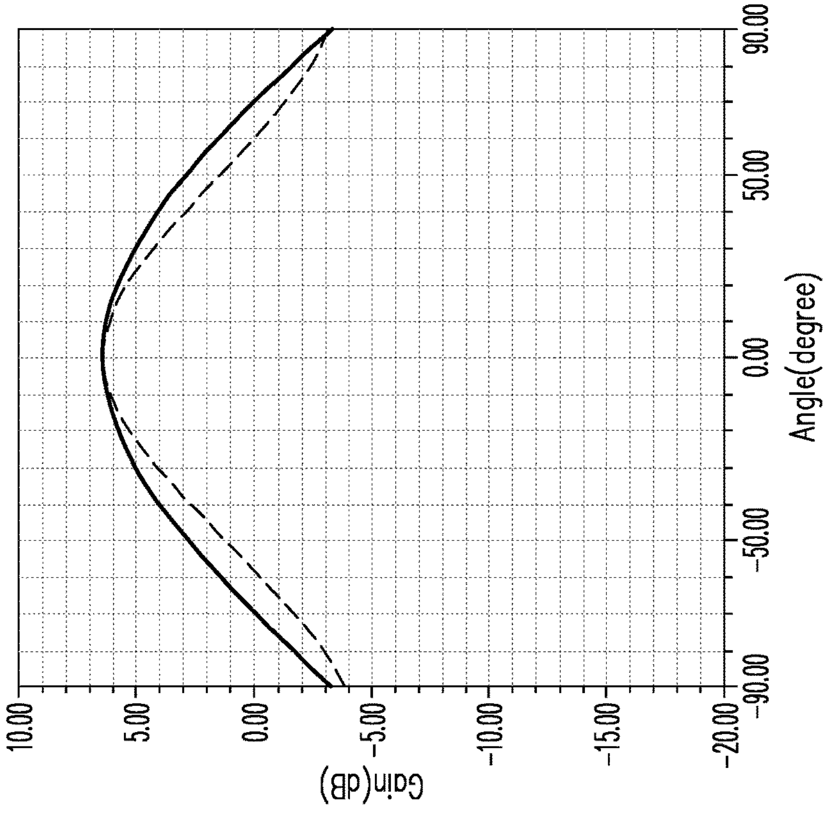
Figure 9C:
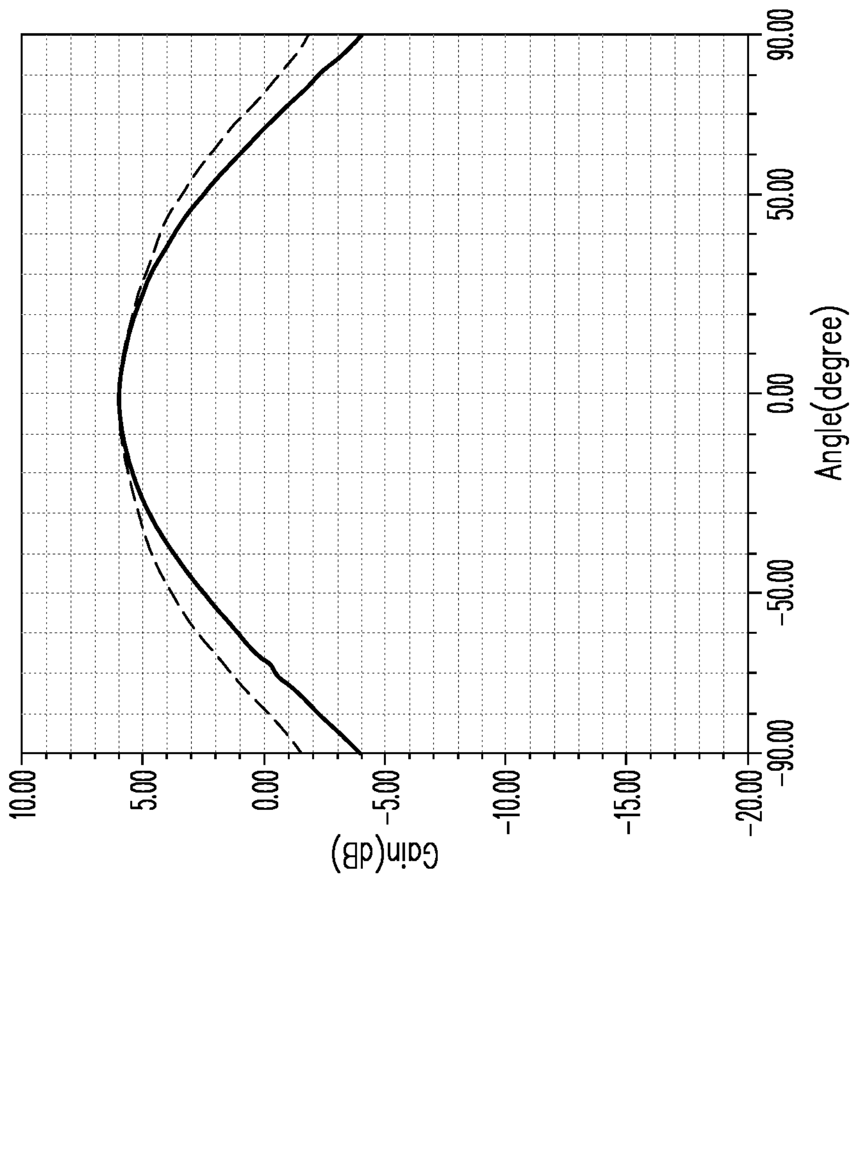

FIG. 9A to FIG. 9C are diagrams respectively illustrating the relationship between angle and gain of the antenna device when the second port of FIG. 6A is activated. FIG. 9A to FIG. 9C respectively show the angle-gain relationship of the antenna device 100*c* of FIG. 6A at frequencies of 26.5 GHz, 27.5 GHz, and 29.5 GHz. Under the circumstances, the second port 131*c* of the antenna device 100*c* is enabled (i.e., the second balun 130*c* is enabled), and the first port 121*c* is disabled (i.e., the first balun 120*c* is disabled).

Please refer to FIG. 9A to FIG. 9C, the solid line represents the angle-gain relationship of the antenna device 100*c* of FIG. 6A on the plane along the first direction A1 and the third direction A3. The dashed line represents the angle-gain relationship of the antenna device 100*c* of FIG. 6A on the plane along the second direction A2 and the third direction A3. As shown in FIG. 9A to FIG. 9C, under the circumstances, the angle-gain relationship of the antenna device 100*c* is substantially and symmetrically distributed, and it may be seen that the antenna device 100*c* has good performance.

In short, the first balun 120*c* and the second balun 130*c* of this embodiment have good performance in converting single-ended signal and double-ended signal. The antenna device 100*c* may still maintain a good gain in the case of having the first balun 120*c* with the multi-layer structure design and the second balun 130*c* with the multi-layer structure design, and the angle-gain relationship of the antenna device 100*c* shows good symmetry.

To sum up, the first wiring of the first balun of the antenna device of the present disclosure does not directly contact the first coupling structure and the second coupling structure, and the orthographic projections of the first coupling structure and the second coupling structure on the first plane are both equally divided by the orthographic projection of the first wiring on the first plane, so it may be seen that the first balun has a multi-layer structure. The first wiring passes through the first U-shaped groove formed by the first coupling structure and the second U-shaped groove formed by the second coupling structure. The user may adjust the coupling amount of the first balun by adjusting the opening widths of the first U-shaped groove and the second U-shaped groove. The first balun has various implementation modes, for example, the openings of the first U-shaped groove and the second U-shaped groove face away from the first radiator, or the openings of the first U-shaped groove and the second U-shaped groove face the first radiator, so that the first wiring is arranged in different planes. In addition, through software simulation, it may be seen that the first balun with a multi-layer structure has good performance in converting single-ended signals and double-ended signals. The antenna device includes a differential antenna and a first balun with a multi-layer structure, and the antenna device may still maintain a good frequency-gain relationship; the angle-gain relationship of the antenna device maintains good symmetry. It may be seen that the antenna device maintains good field symmetry and antenna performance.

The user may further combine the first baluns of the two different modes. For example, in an embodiment, the antenna device has a first balun and a second balun. The openings of the first U-shaped groove and the second U-shaped groove of the first balun face away from the first radiator, and the openings of the first U-shaped groove and the second U-shaped groove of the second balun face the first radiator. The first wiring and the second wiring are located on different planes and avoid each other. Through software analysis of the properties of the antenna device, the first balun and the second balun under the circumstances respectively maintain good performance in converting single-ended signal and double-ended signal, and the antenna device maintains a good frequency-gain relationship; the angle-gain relationship of the antenna device maintains good symmetry.

What is claimed is:

1. An antenna device, comprising:
- a differential antenna, comprising:
  - a first radiator, comprising a first surface;
  - a first antenna port, connected to the first surface of the first radiator; and
  - a second antenna port, connected to the first surface of the first radiator, wherein orthographic projections of the first antenna port and the second antenna port projected to the first radiator are symmetrical to a midpoint of the first radiator; and
- a first balance-to-unbalance converter (BALUN), located on one side of the first surface of the first radiator, wherein an orthographic projection of the first balun on a first plane where the first surface is located overlaps the first surface, and the first balun comprises:
  - a first port;
  - a first wiring, connected to the first port and extending along a first direction;
  - a first coupling structure, electrically connected to the first antenna port; and
  - a second coupling structure, electrically connected to the second antenna port;
  - wherein neither the first coupling structure nor the second coupling structure directly contacts the first wiring, an orthographic projection of the first coupling structure on the first plane and an orthographic projection of the second coupling structure on the first plane are both equally divided by an orthographic projection of the first wiring on the first plane.

2. The antenna device according to claim 1, wherein the first coupling structure comprises a first conductor layer, and the second coupling structure comprises a second conductor layer, the first conductor layer and the second conductor layer are located between the first wiring and the first radiator.

3. The antenna device according to claim 1, wherein the first coupling structure comprises a first conductor layer, and the second coupling structure comprises a second conductor layer, the first wiring is located between the first conductor layer and the first radiator, and between the second conductor layer and the first radiator.

4. The antenna device according to claim 1, wherein the first coupling structure comprises a first conductor layer and two first sidewall structures connected to the first conductor layer, and the second coupling structure comprises a second conductor layer and two second sidewall structures connected to the second conductor layer, the first wiring is located between the two first sidewall structures and between the two second sidewall structures.

5. The antenna device according to claim 4, wherein the first coupling structure comprises a first U-shaped groove jointly formed by the first conductor layer and the two first sidewall structures, and the second coupling structure comprises a second U-shaped groove jointly formed by the second conductor layer and the two second sidewall structures, an opening of the first U-shaped groove and an opening of the second U-shaped groove face away from the first radiator.

6. The antenna device according to claim 4, wherein the first coupling structure comprises a first U-shaped groove jointly formed by the first conductor layer and the two first sidewall structures, and the second coupling structure comprises a second U-shaped groove jointly formed by the second conductor layer and the two second sidewall structures, an opening of the first U-shaped groove and an opening of the second U-shaped groove face the first radiator.

7. The antenna device according to claim 1, wherein the first coupling structure comprises a first conductor layer and a first ground port electrically connected to the first conductor layer, the first conductor layer comprises a first side and a second side opposite to each other, and orthographic projections of the first side and the second side on the first plane intersect with the orthographic projection of the first wiring on the first plane, and an orthographic projection of the first antenna port on the first plane is close to the orthographic projection of the first side on the first plane, an orthographic projection of the first ground port on the first plane is close to the orthographic projection of the second side on the first plane.

8. The antenna device according to claim 7, wherein the antenna device is adapted to operate in a radiation frequency band, a length component of a connection line between the orthographic projection of the first antenna port on the first plane and the orthographic projection of the first ground port on the first plane in the first direction is between 0.2 times to 0.3 times a wavelength belonging to the radiation frequency band.

9. The antenna device according to claim 1, wherein the second coupling structure comprises a second conductor layer and a second ground port electrically connected to the second conductor layer, the second conductor layer comprises a third side and a fourth side opposite to each other, orthographic projections of the third side and the fourth side on the first plane intersect with the orthographic projection of the first wiring on the first plane, and an orthographic projection of the second antenna port on the first plane is close to the orthographic projection of the third side on the first plane, an orthographic projection of the second ground port on the first plane is close to the orthographic projection of the fourth side on the first plane.

10. The antenna device according to claim 9, wherein the antenna device is adapted to operate in a radiation frequency band, a length component of a connection line between the orthographic projection of the second antenna port on the first plane and the orthographic projection of the second ground port on the first plane in the first direction is between 0.2 times to 0.3 times a wavelength belonging to the radiation frequency band.

11. The antenna device according to claim 1, further comprising a first ground layer and a second ground layer located above the first ground layer, wherein the first balun is located between the first ground layer and the second ground layer.

12. The antenna device according to claim 1, wherein the antenna device is adapted to operate in a radiation frequency band, the first radiator comprises a first connection portion contacting the first antenna port and a second connection portion contacting the second antenna port, a length of the first radiator in a direction along a connection line of the first connection portion and the second connection portion is between 0.4 times and 0.6 times a wavelength belonging to the radiation frequency band.

13. The antenna device according to claim 1, wherein the differential antenna further comprises a second radiator located on one side of a second surface of the first radiator and a plurality of vias connected to the first radiator and the second radiator, an orthographic projection of the second radiator on the first plane where the first surface is located overlaps the first surface.

14. The antenna device according to claim 1, wherein the differential antenna further comprises:

a third antenna port, connected to the first surface of the first radiator; and a fourth antenna port, connected to the first surface of the first radiator, wherein orthographic projections of the third antenna port and the fourth antenna port projected to the first radiator are symmetrical to the midpoint of the first radiator;

the antenna device further comprising:

a second balun, located at the one side of the first surface of the first radiator, wherein an orthographic projection of the second balun on the first plane where the first surface is located overlaps the first surface, and the second balun comprising:

a second port;

a second wiring, connected to the second port and extending along a second direction, wherein the second direction is perpendicular to the first direction, and the first wiring and the second wiring are located on different planes;

a third coupling structure, electrically connected to the third antenna port; and a fourth coupling structure, electrically connected to the fourth antenna port, wherein neither the third coupling structure nor the fourth coupling structure directly contacts the second wiring, an orthographic projection of the third coupling structure on the first plane and an orthographic projection of the fourth coupling structure on the first plane are both equally divided by an orthographic projection of the second wiring on the first plane.

15. The antenna device according to claim 14, wherein the first coupling structure comprises a first conductor layer, the second coupling structure comprises a second conductor layer, and the first conductor layer and the second conductor layer are located between the first wiring and the first radiator, the third coupling structure comprises a third conductor layer, the fourth coupling structure comprises a fourth conductor layer, the second wiring is located between the third conductor layer and the first radiator, and is located between the fourth conductor layer and the first radiator.

16. The antenna device according to claim 14, wherein the first wiring is located between the third coupling structure and the fourth coupling structure, and a distance between the first wiring and the third coupling structure is the same as a distance between the first wiring and the fourth coupling structure.

17. The antenna device according to claim 14, wherein the second wiring is located between the first coupling structure and the second coupling structure, and a distance between the second wiring and the first coupling structure is the same as a distance between second wiring and the second coupling structure.

* * * * *